(12) United States Patent
Yamazaki et al.

(10) Patent No.: US 9,519,183 B2
(45) Date of Patent: Dec. 13, 2016

(54) LIQUID CRYSTAL DISPLAY DEVICE HAVING OPTICAL SENSOR

(75) Inventors: Shunpei Yamazaki, Tokyo (JP); Satoshi Toriumi, Kanagawa (JP); Toshiyuki Isa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 222 days.

(21) Appl. No.: 13/198,203

(22) Filed: Aug. 4, 2011

(65) Prior Publication Data

US 2012/0033156 A1  Feb. 9, 2012

(30) Foreign Application Priority Data

Aug. 6, 2010 (JP) ................................ 2010-177025

(51) Int. Cl.
  *G02F 1/1335* (2006.01)
  *G02F 7/00* (2006.01)

(52) U.S. Cl.
  CPC ... *G02F 1/133555* (2013.01); *G02F 1/133615* (2013.01); *G02F 2001/133618* (2013.01); *G02F 2201/58* (2013.01)

(58) Field of Classification Search
  USPC ......................................................... 349/62
  See application file for complete search history.

(56) References Cited

U.S. PATENT DOCUMENTS

| | | |
|---|---|---|
| 4,409,134 A | 10/1983 | Yamazaki |
| 5,571,578 A | 11/1996 | Kaji et al. |
| 5,614,732 A | 3/1997 | Yamazaki |
| 6,490,021 B1 | 12/2002 | Koyama |
| 7,301,523 B2 | 11/2007 | Kamei |

(Continued)

FOREIGN PATENT DOCUMENTS

| | | |
|---|---|---|
| JP | 4-242724 | 8/1992 |
| JP | 5-224626 | 9/1993 |

(Continued)

OTHER PUBLICATIONS

Lee. C.-H. et al., "Top-Gate TFTs Using 13.56 MHz PECVD Microcrystalline Silicon," IEEE Electron Device Letters, vol. 26, No. 9, Sep. 5, 2005, pp. 637-639.

(Continued)

*Primary Examiner* — Lauren Nguyen
(74) *Attorney, Agent, or Firm* — Husch Blackwell LLP

(57) ABSTRACT

A liquid crystal display device which includes a pair of substrates, a pixel including a liquid crystal element between the pair of substrates, a lighting portion provided on the outer side of the pair of substrates, a first polarizing member between the pair of substrates and the lighting portion, a reflective member provided outside the lightning portion, a second polarizing member on a side opposite to the first polarizing member with the pair of substrates provided therebetween, and a first optical sensor and a second optical sensor. The first optical sensor has a function of detecting illuminance of external light, and the second optical sensor has a function of detecting a color tone of polarized light emitted from the pixel portion. The lightning portion can emits light having a predetermined wavelength depending on the color tone of the pixel portion which is detected by the second optical sensor.

22 Claims, 14 Drawing Sheets

(56) References Cited

U.S. PATENT DOCUMENTS

| | | |
|---|---|---|
| 7,408,534 B2 | 8/2008 | Koyama |
| 7,651,896 B2 | 1/2010 | Honda et al. |
| 7,855,709 B2 | 12/2010 | Kamei |
| 7,950,816 B2 | 5/2011 | Moriya et al. |
| 7,977,168 B2 | 7/2011 | Honda et al. |
| 8,138,500 B2 | 3/2012 | Hosoya |
| 8,519,398 B2 | 8/2013 | Hosoya |
| 8,569,120 B2 | 10/2013 | Takahashi et al. |
| 8,659,014 B2 | 2/2014 | Honda et al. |
| 8,884,297 B2 | 11/2014 | Tezuka et al. |
| 2002/0089840 A1 | 7/2002 | Kawakami et al. |
| 2003/0218701 A1 | 11/2003 | Kawakami |
| 2006/0113894 A1 | 6/2006 | Fujii et al. |
| 2007/0045627 A1 | 3/2007 | Park et al. |
| 2007/0072439 A1 | 3/2007 | Akimoto et al. |
| 2007/0221943 A1* | 9/2007 | Moriya et al. .......... 257/99 |
| 2008/0129927 A1* | 6/2008 | Hamada et al. ......... 349/65 |
| 2008/0158138 A1* | 7/2008 | Yamazaki et al. ...... 345/102 |
| 2009/0045409 A1 | 2/2009 | Yamazaki et al. |
| 2009/0047775 A1 | 2/2009 | Yamazaki et al. |
| 2009/0090915 A1 | 4/2009 | Yamazaki et al. |
| 2009/0135318 A1 | 5/2009 | Tateuchi et al. |
| 2009/0146992 A1 | 6/2009 | Fukunaga et al. |
| 2009/0321737 A1* | 12/2009 | Isa et al. ................. 257/57 |
| 2011/0148835 A1 | 6/2011 | Yamazaki |

FOREIGN PATENT DOCUMENTS

| | | |
|---|---|---|
| JP | 6-37313 | 2/1994 |
| JP | 2000-002890 A | 1/2000 |
| JP | 2000-029022 A | 1/2000 |
| JP | 2000-98371 | 4/2000 |
| JP | 2002-133907 | 5/2002 |
| JP | 2002-277872 A | 9/2002 |
| JP | 2003-330020 | 11/2003 |
| JP | 2004-361618 A | 12/2004 |
| JP | 2007-96055 | 4/2007 |
| JP | 2008-009090 A | 1/2008 |
| JP | 2008-085312 A | 4/2008 |
| JP | 2008-235756 | 10/2008 |
| JP | 2009-265635 A | 11/2009 |
| JP | 2010-141306 A | 6/2010 |

OTHER PUBLICATIONS

Sazonov, A. et al., "Low-Temperature Materials and Thin Film Transistors for Flexible Electronics," Proceedings of the IEEE, vol. 93, No. 8, Aug. 1, 2005, pp. 1420-1428.

Lee, C.-H. et al., "Postdeposition Thermal Annealing and Material Stability of 75° C. Hydrogenated Nanocrystalline Silicon Plasma-Enhanced Chemical Vapor Deposition Films ," Journal of Applied Physics, vol. 98, No. 3, Aug. 4, 2005, pp. 034305-1-034305-7.

Lee, C.-H. et al., "How to Achieve High Mobility Thin Film Transistors by Direct Deposition of Silicon Using 13.56 MHz RF PECVD?," IEDM 06: Technical Digest of International Electron Devices Meeting, Dec. 11, 2006, pp. 295-298.

Lee, C.-H. et al., "Directly Deposited Nanocrystalline Silicon Thin-Film Transistors with Ultra High Mobilities," Applied Physics Letters, vol. 89, No. 25, Dec. 18, 2006, pp. 252101-1-252101-3.

Lee, C.-H. et al., "Stability of nc-Si:H TFTs with Silicon Nitride Gate Dielectric," IEEE Transactions on Electron Devices, vol. 54, No. 1, 2007, pp. 45-51.

Arai, T. et al., "41.2: Micro Silicon Technology for Active Matrix OLED Display," SID Digest '07: SID International Symposium Digest of Technical Papers, vol. 38, 2007, pp. 1370-1373.

Esmaeili-Rad, M.R. et al., "Stability of Nanocrystalline Silicon Bottom-Gate Thin-Film Transistors with Silicon Nitride Gate Dielectric," Journal of Applied Physics, vol. 102, No. 6, Sep. 28, 2007, pp. 064512-1-064512-7.

Esmaeili-Rad, M.R. et al., "Absence of Defect State Creation in Nanocrystalline Silicon Thin-Film Transistors Deduced from Constant Current Stress Measurements," Applied Physics Letters, vol. 91, No. 11, Sep. 12, 2007, pp. 113511-1-113511-3.

Lee, H.J. et al., "Leakage Current Mechanisms in Top-Gate Nanocrystalline Silicon Thin-Film Transistors," Applied Physics Letters, vol. 92, Feb. 28, 2008, pp. 083509-1-083509-3.

\* cited by examiner

9300

1700

LIQUID CRYSTAL DISPLAY DEVICE HAVING OPTICAL SENSOR

BACKGROUND OF THE INVENTION

1. Field of the Invention

The present invention relates to a liquid crystal display device and a method for manufacturing the liquid crystal display device.

2. Description of the Related Art

Liquid crystal display devices for outdoor use, such as digital signage, have been developed.

As a liquid crystal display device suitable for outdoor use, for example, a reflective liquid crystal display device that displays an image with the use of external light, and further, a liquid crystal display device that is obtained by adding a side light to a reflective liquid crystal display device so that display of an image can be performed even in the situation where external light is insufficient are given (see Patent Document 1).

In addition, a semi-transmissive liquid crystal display device which functions as a reflective liquid crystal display device in the case with external light, and functions as a transmissive liquid crystal display device in the case where external light is insufficient (see Patent Document 2).

REFERENCE

Patent Document

[Patent Document 1] Japanese Published Patent Application No. 2000-98371
[Patent Document 2] Japanese Published Patent Application No. 2002-133907

SUMMARY OF THE INVENTION

However, it is necessary that the conventional semi-transmissive liquid crystal display device be provided with a light-transmitting pixel electrode for a transmissive type and provided with a reflective pixel electrode for a reflective type, which causes a low aperture ratio of every pixel.

In addition, a liquid crystal display device installed in the outdoors is directly irradiated with sunlight when the weather is sunny, so that the liquid crystal display device itself has a high temperature. In particular, the electrical characteristics of an amorphous silicon thin film transistor (TFT), which is widely used in an active matrix liquid crystal display device, vary at a high temperature, which causes low reliability at a high temperature.

Then, the refractive index of a liquid crystal material is lowered under severe environments such as at high temperature or low temperature. Therefore, transmittance of a certain wavelength is reduced and the color tone of a displayed image of a liquid crystal display device is changed.

Thus, an object of an embodiment of the present invention is to provide a high-definition liquid crystal display device which can be for outdoor use and in which few changes in the color tone occur.

An embodiment of the present invention is a liquid crystal display device. The liquid crystal display device functions as a reflective liquid crystal display device using external light in a bright external environment and functions as a transmissive liquid crystal display device using light emitted from a lighting portion including at least a light source and a light guide member in an environment without external light. The liquid crystal display device displays an image using both external light and light emitted from the lighting portion in a dim or dark external environment. The above switching can be performed by a first optical sensor provided in the liquid crystal display device.

In the liquid crystal display device, a second optical sensor provided in the liquid crystal display device can detect a change in a color tone of a displayed image, and the light source of the lighting portion can emit light for correcting the change in the color tone.

In addition, the aperture ratio of the liquid crystal display device can be increased because it is unnecessary that the liquid crystal display device be provided with a transmissive pixel electrode for a transmissive type and be provided with a reflective pixel electrode for a reflective type in every pixel.

Thus, one embodiment of the present invention is a liquid crystal display device including a pair of light-transmitting substrates, a pixel including at least a liquid crystal element between the pair of substrates, a lighting portion that makes light incident on at least the pixel portion, which is provided on an outer side of the pair of substrates; a first polarizing member between the pair of substrates and the lighting portion, a reflective member provided outside the lighting portion, a second polarizing member on a side opposite to the first polarizing member with the pair of substrates provided therebetween, a first optical sensor provided outside the pixel portion, and a second optical sensor provided to face the pair of substrates with the second polarizing member provided therebetween. The first optical sensor has a function of detecting illuminance of external light, and the second optical sensor has a function of detecting a color tone of polarized light emitted from the pixel portion.

The pixel portion of the liquid crystal display device is of a passive matrix type or an active matrix type.

In addition, in the case of the active matrix type, a switching element controlling the potential of the pixel electrode is a transistor including a semiconductor having a plurality of crystal regions or an oxide semiconductor. In the case of using an oxide semiconductor, the oxide semiconductor may be an amorphous oxide semiconductor or an oxide semiconductor film having a plurality of crystal regions.

In the liquid crystal display device, an optical member may be provided between the pair of substrates and the light guide member included in the lighting portion in order to improve the efficiency of incidence of light on the pixel portion including a liquid crystal element, the luminance of an image displayed on the pixel portion, and the like.

According to one embodiment of the present invention, a liquid crystal display device having high definition and good temperature characteristics in which color change can be corrected can be provided. In addition, owing to the good temperature characteristics, a liquid crystal display device which is suitable for outdoor use can be provided.

DETAILED DESCRIPTION OF THE INVENTION

Figure 1A:
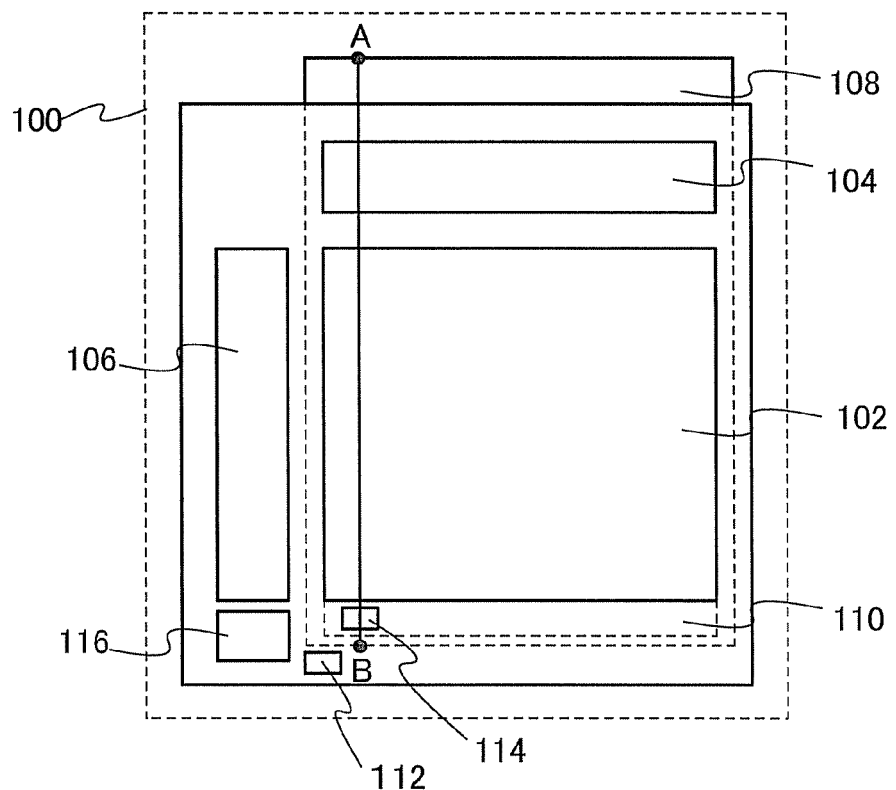
FIGS. 1A and 1B are block diagrams each illustrating a structure of a liquid crystal display device.

Hereinafter, embodiments and an example of the present invention will be described in detail with reference to the accompanying drawings. Note that the present invention is not limited to the description below, and it is easily understood by those skilled in the art that a variety of changes and modifications can be made without departing from the spirit and scope of the present invention. Accordingly, the invention should not be construed as being limited to the description of the embodiments and the example below. In describing structures of the present invention with reference to the drawings, the same reference numerals are used in common for the same portions in different drawings. The same hatching pattern is applied to similar parts, and the similar parts are not especially denoted by reference numerals in some cases. In addition, an insulating layer is not illustrated in a top view in some cases. Note that the size, the layer thickness, or the region of each structure illustrated in each drawing is exaggerated for clarity in some cases and thus the actual scale is not necessarily limited to the illustrated scale. Therefore, the present invention is not necessarily limited to such scales illustrated in the drawings.

Note that when it is described that "A and B are connected to each other", the case where A and B are electrically connected to each other, and the case where A and B are directly connected to each other are included therein. Here, each of A and B corresponds to an object (e.g., a device, an element, a circuit, a wiring, an electrode, a terminal, a conductive film, or a layer).

Note that, functions of "source" and "drain" may become switched in the case that a direction of a current flow is changed during circuit operation, for example. Therefore, the tutus "source" and "drain" can be used to denote the drain and the source, respectively, in this specification.

Note that on-state current refers to a current which flows between a source electrode and a drain electrode when a thin film transistor is in an on state. For example, in the case of an n-channel thin film transistor, the on-state current refers to a current which flows between a source electrode and a drain electrode when a gate voltage is higher than a threshold voltage of the transistor.

In addition, off-current refers to a current which flows between a source electrode and a drain electrode when a thin film transistor is off. For example, in an n-channel thin film transistor, the off-state current is current which flows between a source electrode and a drain electrode when gate voltage is lower than threshold voltage of the thin film transistor.

Embodiment 1

In this embodiment, a liquid crystal display device 100 that is one embodiment of the present invention will be described with reference to FIGS. 1A and 1B, FIG. 2, FIGS. 3A to 3D, FIGS. 4A and 4B, and FIGS. 5A and 5B.

Figure 1B:
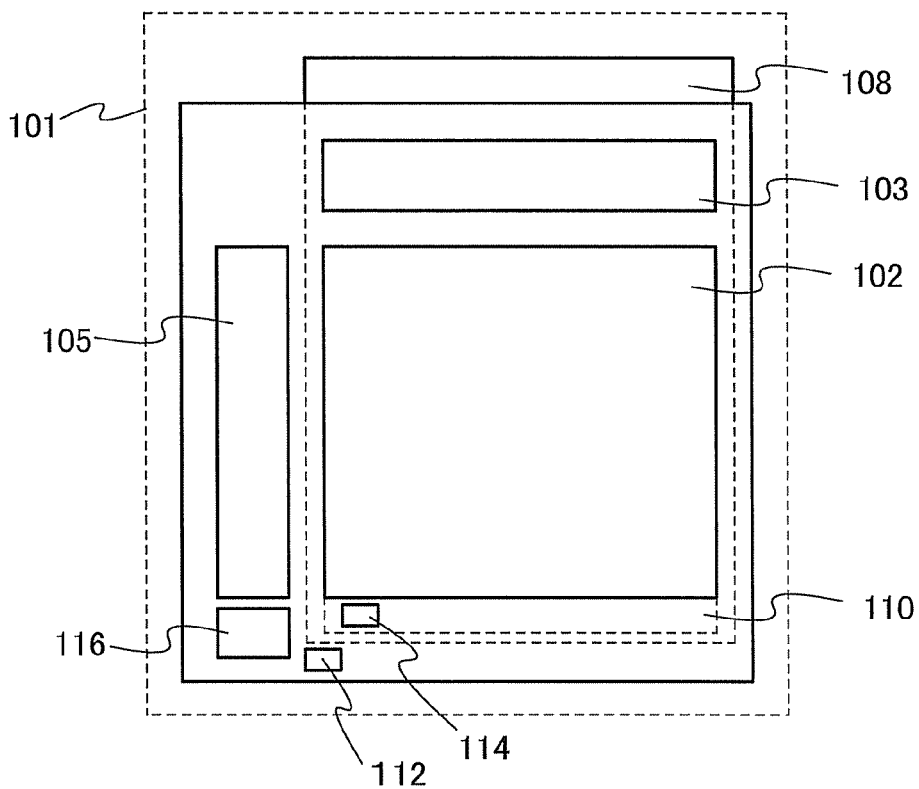

A liquid crystal display device (mainly, a pixel portion) that is one embodiment of the present invention can be applied to either a passive matrix type or an active matrix type. FIG. 1A is a block diagram illustrating a structure of an active matrix type, and FIG. 1B is a block diagram illustrating a structure of a passive matrix type.

In FIG. 1A, the liquid crystal display device 100 of an active matrix type includes, over a substrate, a pixel portion 102, a signal line driver circuit 104, a scan line driver circuit 106, a lighting portion 108 that makes light incident on the pixel portion 102, a monitoring pixel portion 110, a first optical sensor 112 that detects the illuminance of external light, a second optical sensor 114 that detects a change in the color tone of a displayed image and is provided in the monitoring pixel portion 110, and a sensor control portion 116 that feeds back signals from the first optical sensor 112 and the second optical sensor 114 to a lighting control portion (not shown) that controls the lighting portion 108.

The monitoring pixel portion 110 may have the same structure as the pixel portion 102. In the monitoring pixel portion 110, wirings and circuits (a driver circuit and the like) may be appropriately provided so as to exchange signals with the sensor control portion 116. Thus, the monitoring pixel portion 110 can be manufactured in a step of manufacturing the pixel portion 102. In addition, a displayed image on the monitoring pixel portion 110 is not necessarily the same as that on the pixel portion 102, and since an image whose change in the color tone can be detected is acceptable, a still image of only a single color may be displayed, for example.

The pixel portion 102 includes a plurality of pixels each provided with a liquid crystal element. The signal line driver circuit 104 controls input of video signals to pixels which are selected. The scan line driver circuit 106 controls scan lines connected to gate electrodes of the pixels. In addition, although not illustrated in FIGS. 1A and 1B, a transistor (mainly, a TFT) is provided as a switching element in every pixel. In this specification, a liquid crystal element is an element which controls transmission or non-transmission of light by optical modulation action of liquid crystal and includes a pair of electrodes and liquid crystal. The optical modulation action of liquid crystal is controlled by an electric field applied to the liquid crystal (including a horizontal electric field, a vertical electric field, and an oblique electric field).

Note that the driver circuits can be largely divided into a logical circuit portion, and a switch portion or a buffer portion, and details of the structures of the driver circuits are omitted. In addition, although the signal line driver circuit 104 and the scan line driver circuit 106 are manufactured over the substrate over which the pixel portion 102 is provided in FIG. 1A, part of the signal line driver circuit 104 and the scan line driver circuit 106 may be mounted using a semiconductor device such as an IC.

In FIG. 1B, the liquid crystal display device 100 of a passive matrix type includes, over a substrate, the pixel portion 102, a segment driver 103, a common driver 105, the lighting portion 108 that makes light incident on the pixel portion 102, the monitoring pixel portion 110, the first optical sensor 112 that detects the illuminance of external light, the second optical sensor 114 that detects a change in the color tone of a displayed image and is provided in the monitoring pixel portion 110, and the sensor control portion 116 that feeds back signals from the first optical sensor 112 and the second optical sensor 114 to a lighting control portion (not shown) that controls the lighting portion 108.

The monitoring pixel portion 110 may have the same structure as the pixel portion 102. In the monitoring pixel portion 110, wirings and circuits (a driver circuit and the like) may be appropriately provided so as to exchange signals with the sensor control portion 116. Thus, the monitoring pixel portion 110 can be manufactured in a step of manufacturing the pixel portion 102. In addition, a displayed image on the monitoring pixel portion 110 is not necessarily the same as that on the pixel portion 102, and since an image whose change in the color tone can be detected is acceptable, a still image of only a signal color may be displayed, for example.

Note that the segment driver 103 outputs display data, and the common driver 105 selects lines. These driver circuits are largely divided into a switch portion and a buffer portion, and details of the structures of the driver circuits are omitted. In addition, although the segment driver 103 and the common driver 105 are included in the liquid crystal display device 100 in FIG. 1B, part of the segment driver 103 and the common driver 105 may be mounted using a semiconductor device such as an IC.

Figure 2:
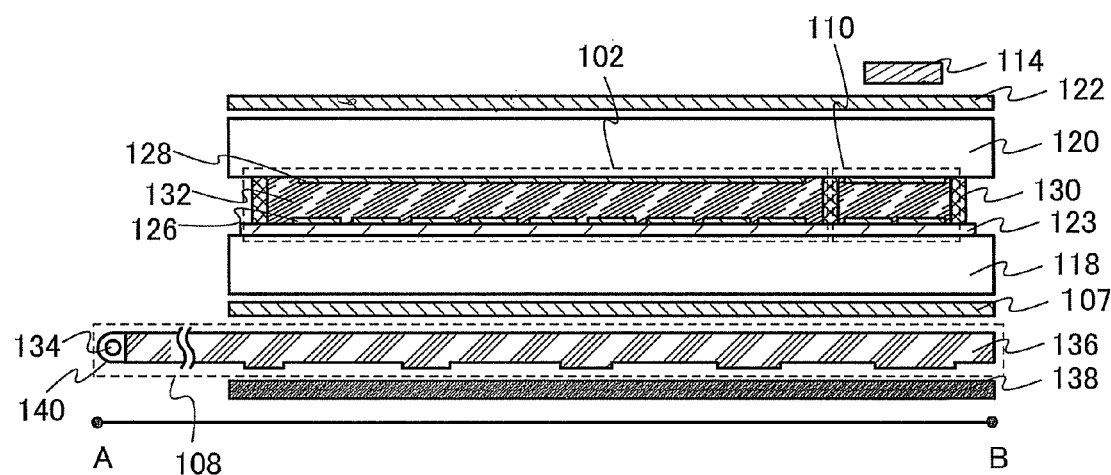
FIG. 2 is a cross-sectional view illustrating a structure of a liquid crystal display device.

FIG. 2 is a cross-sectional view taken along line A-B of FIG. 1A. Note that a cross section of the signal line driver circuit 104 is omitted.

As illustrated in FIG. 2, in a portion between A-B of the liquid crystal display device 100, the pixel portion 102 and the monitoring pixel portion 110 are provided between a substrate 118 and a counter substrate 120. A first polarizing member 107, the lighting portion 108 provided below the first polarizing member 107, and a reflecting member 138 provided below the lighting portion 108 are provided below the substrate 118. A second polarizing member 122 and the second optical sensor 114 overlapping with the monitoring pixel portion 110 are provided over the counter substrate 120.

The pixel portion 102 and the monitoring pixel portion 110 include a transistor element layer 123 including switching elements provided over the substrate 118, pixel electrodes 126 provided over the transistor element layer 123, a common pixel electrode 128 provided in contact with the counter substrate, a sealant 130, and liquid crystal 132 that transmits or blocks incident light. Although not shown in FIG. 2, a spacer is provided so that a distance (a cell gap) between the pixel electrode 126 and the common pixel electrode 128 is controlled to be constant. As the spacer, a bead spacer or a spacer obtained by selective etching an insulating layer (a post spacer) can be used.

In the lighting portion 108, at least a light source 134 capable of emitting light having a predetermined wavelength, and a light guide member 136 that converts light emitted from the light source 134 into a uniform planar light source are provided.

In addition, the reflecting member 138 that reflects external light and makes the light incident on the pixel portion is provided below the lighting portion 108.

Although not shown in FIG. 2, another optical member such as a reflecting member, a diffusion member, a prism, or another polarizing member may be appropriately provided between the substrate 118 and the lighting portion 108 in order to improve the efficiency of incidence of light on the pixel portion 102 including the liquid crystal elements and the luminance of an image displayed on the pixel portion 102. In addition, a plate-like optical member or a film-like optical member can be used as the optical member. It is preferable to use a film-like optical member because reduction in the thickness of the liquid crystal display device 100 can be achieved. In addition, in this embodiment, a reflective sheet 140 is provided to improve the efficiency in irradiation of the light source 134.

As the substrate 118 and the counter substrate 120, a light-transmitting substrate is preferable, for example, a glass substrate of barium borosilicate glass, aluminoborosilicate glass, or the like; a quartz substrate; or a plastic substrate which can withstand a process temperature in a manufacturing process of the liquid crystal display device 100 can be used. As the substrate 118 and the counter substrate 120, a glass substrate having any of the following sizes can be used: the 3rd generation (550 mm×650 mm), the 3.5th generation (600 mm×720 mm or 620 mm×750 mm), the 4th generation (680 mm×880 mm or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm or 2450 mm×3050 mm), and the 10th generation (2950 mm×3400 mm).

Details of the transistor element layer 123 are described later, and the switching element (mainly, the TFT) included in the transistor element layer 123 is preferably formed using a semiconductor which has good temperature characteristics so as to operate even at high temperature or low temperature. The switching element using the semiconductor has high reliability and a small variation in the threshold voltage even at a high temperature close to 100° C., and therefore, the switching element operates with high performance even under an environment whose temperature largely varies. As a typical example of the semiconductor having good temperature characteristics, microcrystalline silicon which has a plurality of crystal regions, or polycrystalline silicon is preferable. Alternatively, an oxide semiconductor can be used. As an oxide semiconductor, In—Ga—Zn-based metal oxide, In—Sn—Zn-based metal oxide, and the like can be given.

The pixel electrode 126 and the common pixel electrode 128 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide containing silicon oxide.

Alternatively, the pixel electrode 126 and the common pixel electrode 128 can be formed using a conductive composition including a conductive high molecule (also referred to as a conductive polymer). In the case of using a conductive composition, a conductive composition having a sheet resistance of 10000 Ω/sq. or less and whose light transmittance is 70% or more at a wavelength of 550 nm is preferably used. Further, the resistivity of the conductive high molecule included in the conductive composition is preferably 0.1 Ω·cm or less.

As the conductive high molecule, a so-called π-electron conjugated conductive high molecule can be used. For example, polyaniline or a derivative thereof, polypyrrole or a derivative thereof, polythiophene or a derivative thereof, a copolymer of two or more of aniline, pyrrole, and thiophene or a derivative thereof, and the like can be given.

As described above, the optical modulation action of the liquid crystal 132 included in the liquid crystal element is controlled by an electric field (including a horizontal electric field, a vertical electric field, and a diagonal electric field) applied to the liquid crystal 132. Note that as the types of the liquid crystal 132, the following can be given: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a ferroelectric liquid crystal, an anti-ferroelectric liquid crystal, a main-chain liquid crystal, a side-chain high-molecular liquid crystal, a plasma addressed liquid crystal (PALC), a banana-shaped liquid crystal, and the like. In addition, the following can be used as a driving mode of the liquid crystal element: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, a TBA (transverse bend alignment) mode, an ASV (advanced super view) mode, an ASM (axially symmetric aligned microcell) mode, an OCB (optical compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, and the like. Note that one embodiment of the present invention is not limited thereto, and various kinds of liquid crystal can be used for the liquid crystal element.

Alternatively, a blue-phase liquid crystal for which an alignment film is not necessary may be used for the liquid crystal 132. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed is used for the liquid crystal layer in order to improve the temperature range. As for the liquid crystal composition which contains blue-phase liquid crystal and a chiral material, the response speed is as high as 10 μs to 100 μs, alignment treatment is not necessary due to optical isotropy, and viewing angle dependence is low.

The sealant 130 is provided for sealing the liquid crystal 132 between the substrate 118 and the counter substrate 120.

As the light source 134 in the above-described lighting portion 108; a cold cathode fluorescent lamp (CCFL), a light emitting diode (LED), an electroluminescence (EL) element, or the like can be used. Further, light sources of R (red), G (green), and B (blue) are preferably provided in addition to a white light source in order to correct a change in a color tone of a displayed image of the pixel portion 102. In the case where only a white light source is provided, an optical filter may be provided between the light source 134 and the light guide member 136 in order that only light having a predetermined wavelength can be emitted.

To convert light emitted from the light source 134 into a uniform planar light source, an acrylic plate which is subjected to special processing can be used for the light guide member 136. Although there is a variety of special processing to be employed, for example, an uneven processing by which the length of a projection becomes larger as the distance from the light source changes is given.

As described above, the reflecting member 138 which reflects external light and makes the light incident on the pixel portion is provided below the lighting portion 108. As the reflecting member 138, a mirror, a highly reflective metal layer, a white member capable of scattering light, or the like can be used. In addition, the shape of the reflecting member 138 can be determined in accordance with the shape of the pixel portion 102, and for example, may be a quadrilateral or has a dot-like shape. Although a plate-like shape member may be employed, when a film-like member is used as the reflecting member 138, reduction in the thickness of the liquid crystal display device 100 is achieved.

There are no particular limitations on the first polarizing member 107 provided between the substrate 118 and the lighting portion 108 and the second polarizing member 122 provided over the counter substrate 120 as long as they can polarize light incident on the pixel portion 102 and light emitted from the pixel portion 102, and for example, a polarizing plate or a polarizing film which is formed using a high molecule such as polyvinyl alcohol or the like can be used. Although the second polarizing member 122 is provided on the outer side of the counter substrate 120 (on the side opposite to the liquid crystal 132) in this embodiment, the second polarizing member 122 may be provided on the inner side of the counter substrate (on the liquid crystal 132 side).

The liquid crystal display device that is one embodiment of the present invention is capable of not only monochrome display but also color display by providing a color filter. In addition, a blocking layer functioning as a black matrix may be provided for the counter substrate 120.

As the first optical sensor 112 that detects the illuminance of external light and the second optical sensor 114 that detects a change in a color tone of an image displayed on the pixel portion, for example, photodiodes formed using Si, CdS, InGaAs, or the like may be used. Considering outdoor use or temperature characteristics, photodiodes formed using single crystal Si are preferable.

A display mode of the liquid crystal display device 100 that is one embodiment of the present invention is described using FIGS. 3A to 3D.

Figure 3A:
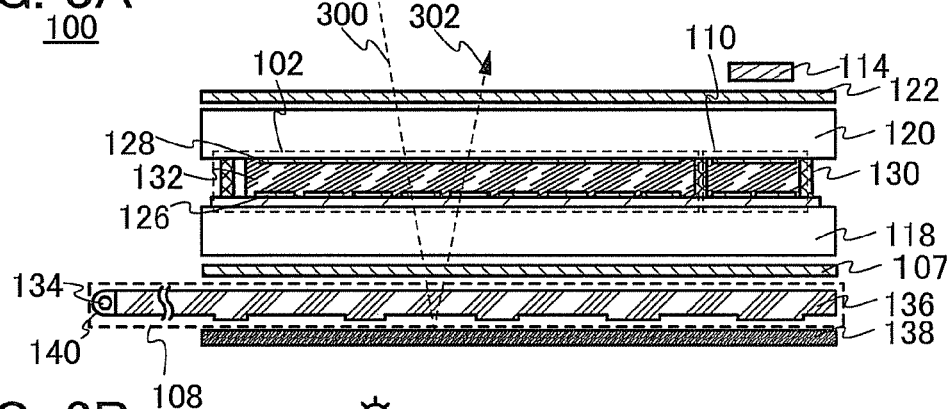
FIGS. 3A to 3D are cross-sectional views for explaining differences between display modes of liquid crystal display devices.
Figure 3B:
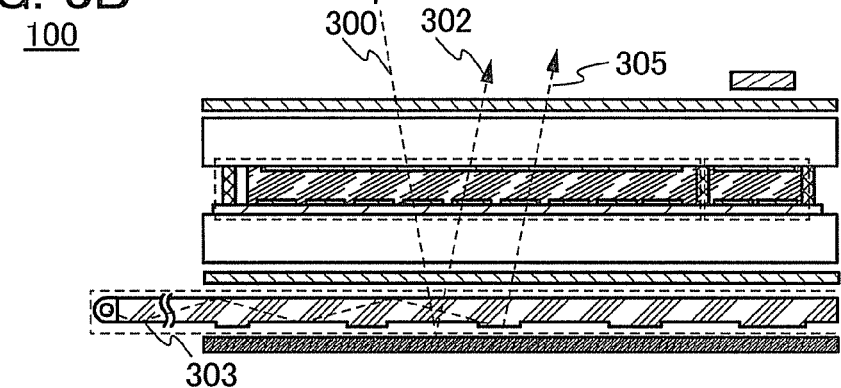

The liquid crystal display device 100 can switch its display mode by detecting the illuminance of light from the outside (external light) with the first optical sensor 112 (see FIGS. 1A and 1B). For example, when the illuminance is high when the weather is sunny as illustrated in FIG. 3A, the liquid crystal display device 100 functions as a reflective type in which external light is utilized for displaying an image.

In other words, incident light 300 passes through the second polarizing member 122, the counter substrate 120, the pixel portion 102, the substrate 118, the first polarizing member 107, and the lighting portion 108 and is reflected at the reflecting member 138. The reflected light passes through the above components in inverse order and an observer perceives polarized light 302 emitted from the second polarizing member 122. In that case, color display is performed when a color filter is used, whereas black-and-white (monochrome) display is performed when a color filter is not used.

By reflective-type image display in such a manner, power for operating the liquid crystal display device 100 (in particular the lighting portion 108) can be omitted, so that power consumption can be reduced.

The operation of the liquid crystal display device 100 under an environment in which external light is strong, such as in the outdoors when the weather is sunny, leads to the operation at a high temperature close to 100° C. Accordingly, the liquid crystal 132 has a high temperature and the refractive index of the liquid crystal 132 differs from the refractive index of the liquid crystal 132 at room temperature, whereby a change in a color tone occurs in a displayed image of the liquid crystal display device 100.

In the case where the change in a color tone occurs, the second optical sensor 114 that overlaps with the monitoring pixel portion 110 detects the change in the color tone, and the sensor control portion 116 sends a signal for correcting the change in the color tone to the lighting control portion (not shown). The operation at a high temperature close to 100° C. in the case of color display with the use of a color filter is specifically described. When the incident light 300 of external light is reflected at the reflecting member 138 and the second optical sensor 114 detects a change in a color tone that expresses a high intensity of blue light in the light (the polarized light 302) emitted from the pixel portion 102, the sensor control portion 116 sends a signal for emission of light which corrects the change in the color tone, to the lighting control portion. By receiving the signal, the light source 134 emits red light and green light (incident light 303) for correcting the change in the color tone. The incident light 303 is emitted as polarized light 305 from the second polarizing member 122 to correct deviation of the color tone of a displayed image of the liquid crystal display device 100 (see FIG. 3B).

Figure 3C:
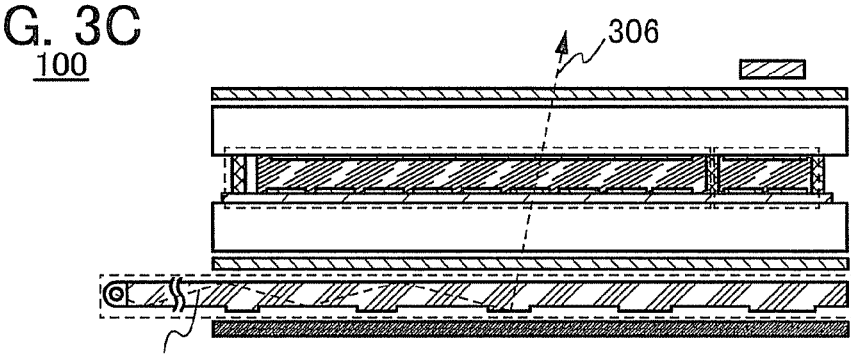

In the case where the first optical sensor 112 detects illuminance which is too low to display an image by the reflective-type liquid crystal display device in the night, in a dim indoor environment, or the like, the liquid crystal display device 100 functions as a transmissive liquid crystal display device that utilizes the light emitted from the lighting portion 108 (see FIG. 3C).

Incident light 304 from the light source 134 is converted into a planar light source in the light guide member 136, and the light passes through the first polarizing member 107 and the substrate 118 to be incident on the pixel portion 102, and further passes through the counter substrate 120 and the second polarizing member 122, so that polarized light 306 emitted from the second polarizing member 122 is perceived by an observer. In that case, color display is performed when a color filter is used, whereas black-and-white (monochrome) display is performed when a color filter is not used.

Figure 3D:
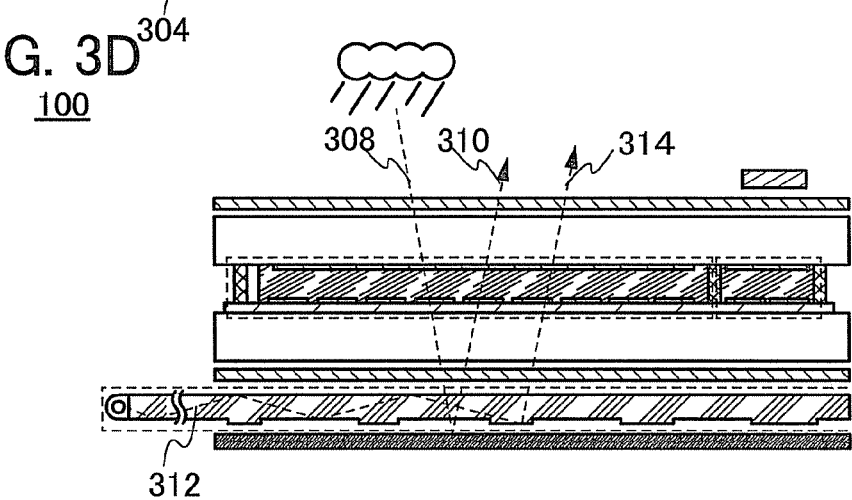

In the case where the first optical sensor 112 detects a small amount of external light and low illuminance such as in the outdoors when the weather is cloudy or rainy or in a dim indoor environment, external light and the light source 134 are utilized for displaying an image in the liquid crystal display device 100 (see FIG. 3D).

That is, polarized light which is perceived by an observer is polarized light 310 and polarized light 314. Incident light 308 passes through the second polarizing member 122, the counter substrate 120, the pixel portion 102, the substrate 118, the first polarizing member 107, and the lighting portion 108, and is reflected at the reflecting member 138, so that the polarized light 310 is emitted from the second polarizing member 122. Incident light 312 from the light source 134 is converted into a planar light source in the light guide member 136, and passes through the first polarizing member 107, the substrate 118, the pixel portion 102, the counter substrate 120, and the second polarizing member 122, so that the polarized light 314 is emitted from the second polarizing member 122. In that case, color display is possible when a color filter is used, whereas black-and-white (monochrome) display is performed when a color filter is not used.

The change in the color tone of a displayed image may occur not only under an outdoor environment at high temperature but also under an environment at low temperature. In other words, the second optical sensor 114 detects the change in the color tone of a displayed image regardless of a usage environment, a temperature, and a display mode. The sensor control portion 116 sends a signal for emitting light which corrects the change in the color tone to the lighting control portion. By receiving the signal, the light source 134 emits light for correcting the change in the color tone. Therefore, the light source 134 preferably includes two kinds of light sources, that is, a light source emitting white light and a light source emitting light for correction. In addition, the light source emitting light for correction preferably emits red light, green light, and blue light. Further, in the case of including only a light source emitting white light, a structure in which an optimal wavelength for correcting the color change is extracted through an optical filter (not shown) and irradiation is performed may be employed.

Here, the liquid crystal display device 100 in the case of an active matrix type is described with reference to FIGS. 4A and 4B.

Figure 4A:
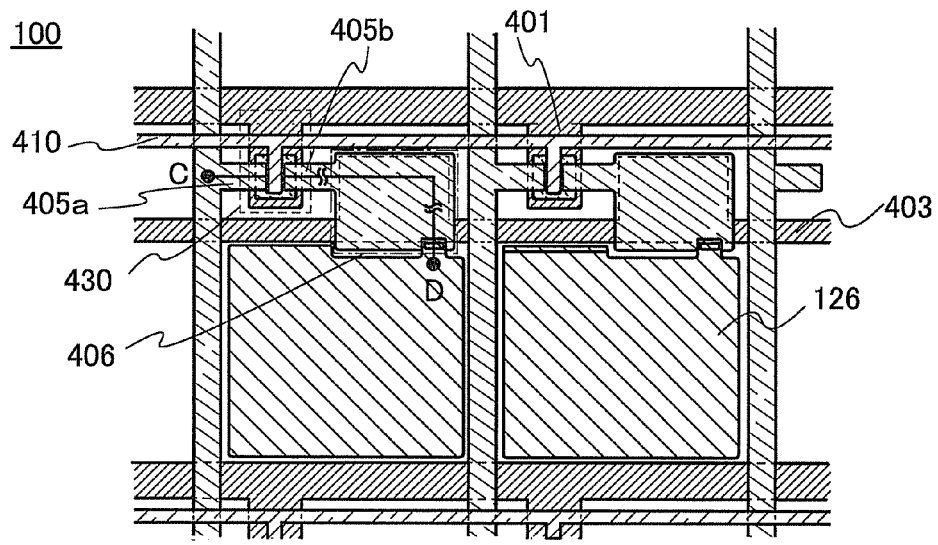
FIGS. 4A and 4B are a top view and a cross-sectional view illustrating a structure of a liquid crystal display device.

FIG. 4A is a top view of two pixels of the liquid crystal display device 100.

As illustrated in FIG. 2, in the liquid crystal display device 100, the transistor element layer 123 is provided for the substrate 118, the common pixel electrode 128 is provided for the counter substrate 120, and the liquid crystal is sealed between the substrate 118 and the counter substrate 120 with the sealant 130 which is for fixing the substrate 118 and the counter substrate 120. In addition, although omitted in FIG. 4A, the liquid crystal 132, the counter substrate 120, the first polarizing member 107, and the second polarizing member 122 are provided as illustrated in FIG. 4B.

In FIG. 4A, a plurality of source wirings (including a source electrode 405a) is provided in parallel to each other (extends in the vertical direction in the drawing) and apart from each other. A plurality of gate wirings (including a gate electrode 401) is provided to extend in a direction generally perpendicular to the source wirings (the horizontal direction in the drawing) and to be apart from each other. The plurality of source wirings is connected to the signal line driver circuit 104 (see FIG. 1A), and the plurality of gate wirings is connected to the scan line driver circuit 106 (see FIG. 1A).

In addition, capacitor wirings 403 are adjacent to the plurality of gate wirings and extend in a direction parallel to the gate wirings, that is, in a direction generally perpendicular to the source wirings (in the horizontal direction in the drawing). A storage capacitor 406 is surrounded by an alternate long and short dashed line in FIG. 4A, and includes a gate insulating film serving as a dielectric, the capacitor wiring 403, and a drain wiring. In addition, the storage capacitor 406 is electrically connected to the pixel electrode 126 and a drain electrode 405b. The capacitor wirings 403 are connected to the scan line driver circuit 106 (see FIG. 1A).

A transistor 430 for driving the pixel electrode 126 is provided at an upper left corner of every pixel. A plurality of pixel electrode 126 and a plurality of transistors 430 are arranged in a matrix.

Figure 4B:
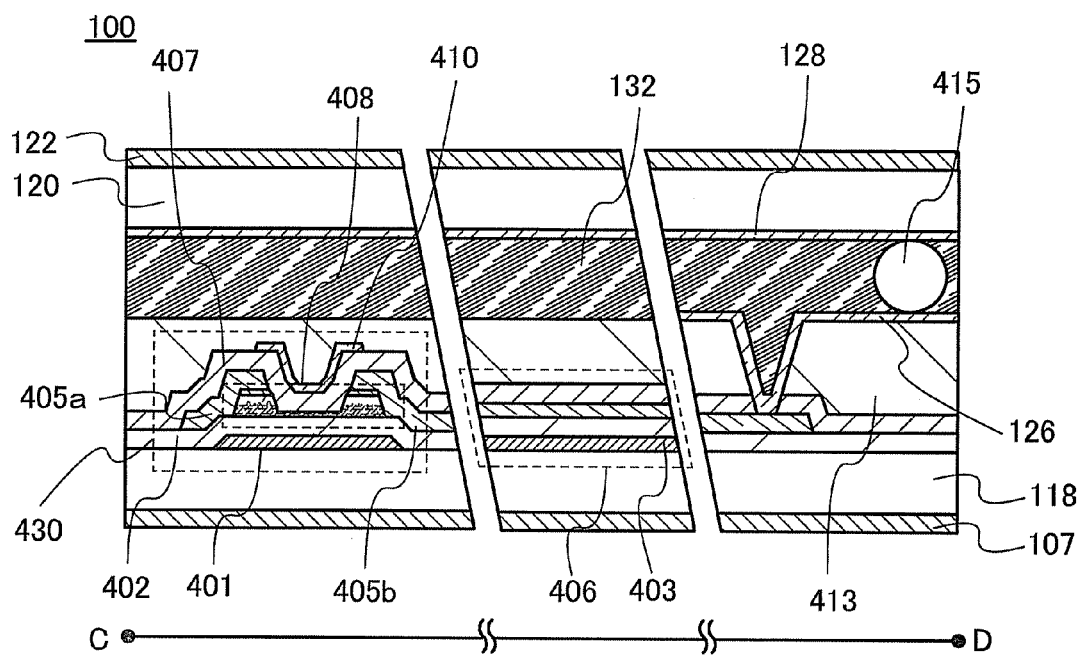

One embodiment is not limited to the pixel configuration illustrated in FIGS. 4A and 4B. Alternatively, a configuration may be employed, in which a capacitor wiring is not provided and a pixel electrode is provided to overlap with a gate wiring of an adjacent pixel with a gate insulating film and another insulating film provided therebetween to form a storage capacitor. In that case, a capacitor wiring can be omitted, whereby the aperture ratio of the pixel can be increased.

In the liquid crystal display device of an active matrix type, display patterns are formed on a screen by driving pixel electrodes that are arranged in a matrix. Specifically, the liquid crystal layer provided between the pixel electrode and the counter electrode is optically modulated by applying voltage between the selected pixel electrode and the counter electrode corresponding to the selected pixel electrode, and this optical modulation is recognized as a display pattern by an observer.

In displaying a moving image, a liquid crystal display device has a problem that a long response time of liquid crystal molecules themselves causes afterimages or blurring of moving images. In order to improve the moving-image characteristics of a liquid crystal display device, a driving method called black insertion is employed in which black is displayed on the whole screen every other frame period.

Further, there is another driving technique which is so-called double-frame rate driving. In the double-frame rate driving, a vertical synchronizing frequency is set 1.5 times or more, preferably, 2 times or more as high as a usual vertical synchronizing frequency, whereby the response speed is increased, and the tones to be written is selected for every plural fields in each frame which have been obtained by dividing.

By combining these driving techniques, the display characteristics of a liquid crystal display device, such as moving-image characteristics, can be improved as compared to those of conventional liquid crystal display devices.

FIG. 4B is a cross-sectional view taken along line C-D of FIG. 4A. A portion between C and D denoted by a wavy line of FIG. 4A is omitted in FIG. 4B.

The structure of transistor 430 is described here and manufacturing processes thereof are described later. The transistor 430 is an inverted-staggered thin film transistor which is formed over the substrate 118 and includes the gate electrode 401, a gate insulating film 402, a semiconductor layer 408, the source electrode 405a, and the drain electrode 405b.

Note that there is no particular limitation on a structure of a transistor which can be applied to the liquid crystal display device disclosed in this specification. For example, a top-gate staggered structure, a bottom-gate staggered structure, a top-gate planar structure, a bottom-gate planar structure, or the like can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure having two gate electrodes, one of which is provided above a channel region with a gate insulating film provided therebetween and the other of which is provided below the channel formation region with another gate insulating film provided therebetween. In this embodiment, a dual-gate structure is employed.

An insulating film 407 that covers the transistor 430 and is in contact with the semiconductor layer 408, and a back gate electrode 410 that is in contact with the insulating film 407 are provided. An interlayer insulating film 413 is stacked over the back gate electrode 410.

In the storage capacitor 406, the gate insulating film 402 serving as a dielectric is stacked between the capacitor wiring 403 and the drain electrode 405b as described above. Since the capacitor wiring 403 can be formed under the same condition as that of the gate wiring (including the gate electrode 401), the capacitor wiring 403 is formed at the time of manufacturing the gate electrode 401. In other words, it is not necessary that the storage capacitor 406 is separately formed from the transistor 430, and the storage capacitor 406 can also be manufactured in the process of manufacturing the transistor 430.

The interlayer insulating film 413 is provided over the transistor 430 and the storage capacitor 406. There is no particular limitation on the method of forming the interlayer insulating film 413, and any of the following methods or tools can be used depending on a material thereof: a method such as a CVD method, a sputtering method, a spin coating method, a dipping method, a spray coating method, or a droplet discharge method (e.g., an ink-jet method, screen printing, or offset printing), or a tool such as a doctor knife, a roll coater, a curtain coater, a knife coater, or the like.

An opening is formed in the interlayer insulating film 413 through an etching step, and the pixel electrode 126 is provided to be electrically connected to the drain electrode 405b. The common pixel electrode 128 is provided for the counter substrate 120. The pixel electrode 126 and the common pixel electrode 128 can be formed using the above-described conductive material by a sputtering method or the like.

The liquid crystal display device 100 can perform monochrome display or color display. In the case of full-color display, a color filter may be faulted using materials exhibiting red (R), green (G), and blue (B); in the case of mono-color display except monochrome display, a color filter may be formed using a material exhibiting at least one color.

The color filter may be provided on the inner side of the substrate 118 and the counter substrate 120 which are adhered to each other with the liquid crystal 132 provided therebetween (on the liquid crystal 132 side) or may be provided on the outer side of the counter substrate 120 (on the side opposite to the liquid crystal 132).

The color filter may be separately provided. Alternatively, in the case of a liquid crystal display device of an active matrix type, an interlayer insulating film may also have a function as a color filter. For example, in the liquid crystal display device 100, a chromatic-color light-transmitting resin layer functioning as a color filter can be used as the interlayer insulating film 413 in FIG. 4B.

In the case where the interlayer insulating film 413 that also functions as a color filter is formed over the substrate 118 over which the transistor element layer 123 is provided, alignment with a pixel region can be performed with accuracy even in a minute-pattern pixel. In addition, since the interlayer insulating film 413 also functions as a color filter, the manufacturing process of the liquid crystal device can be simplified and cost can be reduced. In the case where a light irradiation step for polymer stabilization is needed for the liquid crystal 132, light irradiation can be uniformly performed on the whole of the liquid crystal 132 because irradiation light from the counter substrate 120 side is not absorbed by the color filter. Thus, alignment disorder of a liquid crystal due to nonuniform photopolymerization, display unevenness due to the alignment disorder, and the like can be prevented.

As the chromatic-color light-transmitting resin that can be used for the color filter layer, a photosensitive organic resin or a non-photosensitive organic resin can be used. Use of the photosensitive organic resin layer makes it possible to reduce the number of resist masks; thus, the process is simplified, which is preferable.

Chromatic colors are colors except achromatic colors such as black, gray, or white. The chromatic-color light-transmitting resin layer is formed using a material which only transmits light colored with chromatic color in order to function as the color filter. As chromatic color, red, green, blue, or the like can be used. Alternatively, cyan, magenta, yellow, or the like may also be used. "Transmitting only the chromatic-color light that is colored" means that the light transmitted through the color filter layer has a peak at a wavelength of the chromatic-color light.

The thickness of the color filter layer may be controlled as appropriate in consideration of the relationship between the concentration of the coloring material to be included and the transmittance of light.

In the case where the thickness of the chromatic-color light-transmitting resin layer varies depending on the color or in the case where there is unevenness due to a light-blocking layer or a transistor, an insulating layer which transmits light in the visible wavelength range (a so-called colorless and transparent insulating layer) may be stacked for planarization. The improved planarization allows favorable coverage with a pixel electrode layer formed over the color filter, and a uniform gap (thickness) of a liquid crystal element, whereby the visibility of the liquid crystal display device can be increased and higher image quality can be achieved.

In the case where the color filter is provided on the outer side of the counter substrate 120 (on the side opposite to the liquid crystal 132), the color filter may be attached to the counter substrate 120.

The substrate 118 and the counter substrate 120 are adhered to each other with the sealant 130 with the liquid crystal 132 provided therebetween. As the liquid crystal 132, the above-described kinds of liquid crystal can be used. The liquid crystal 132 may be formed by a dispenser method (a dropping method) or an injection method in which capillary action is utilized after the substrate 118 and the counter substrate 120 are attached to each other. The alignment of the liquid crystal 132 can easily performed by rubbing treatment with the use of an alignment film.

In addition, a spacer 415 is provided so that the distance (the cell gap) between the pixel electrode 126 and the common pixel electrode 128 is controlled to be constant. Although a bead spacer is used here, a spacer obtained by selectively etching an insulating layer (a post spacer) may be used. The cell gap is preferably greater than or equal to 1 μm and less than or equal to 20 μm. In this specification, the thickness of a cell gap refers to the length (film thickness) of a thickest part of liquid crystal.

As the sealant 130, it is typically preferable to use visible light curable, ultraviolet curable, or heat curable resin. Typically, an acrylic resin, an epoxy resin, an amine resin, or the like can be used. Further, a photopolymerization initiator (typically, an ultraviolet light polymerization initiator), a thermosetting agent, a filler, or a coupling agent may also be included.

Although not shown in FIGS. 4A and 4B, the lighting portion 108 and the reflecting member 138 are provided on the outer side of the first polarizing member 107. In addition, the second polarizing member 122 is provided on the outer side of the counter substrate 120 (on the side opposite to the liquid crystal 132).

In addition to the first polarizing member 107 and the second polarizing member 122, an optical member such as a retardation plate (including a retardation film) or an anti-reflection plate (including an anti-reflection film) may be provided.

Figure 5A:
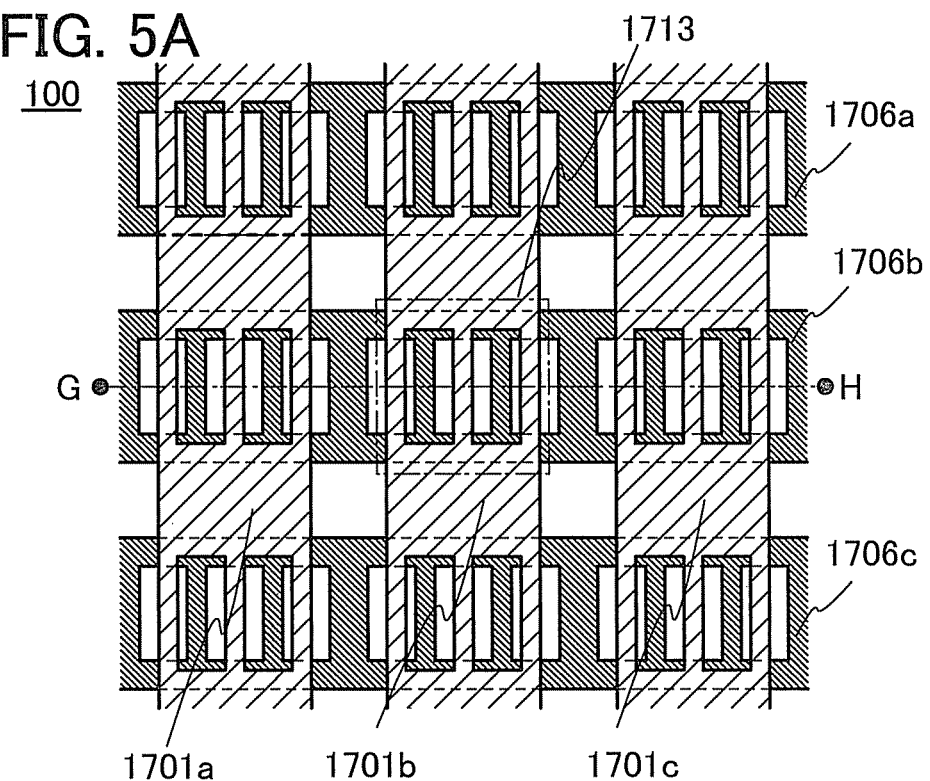
FIGS. 5A and 5B are a top view and a cross-sectional view illustrating a structure of a liquid crystal display device.
Figure 5B:
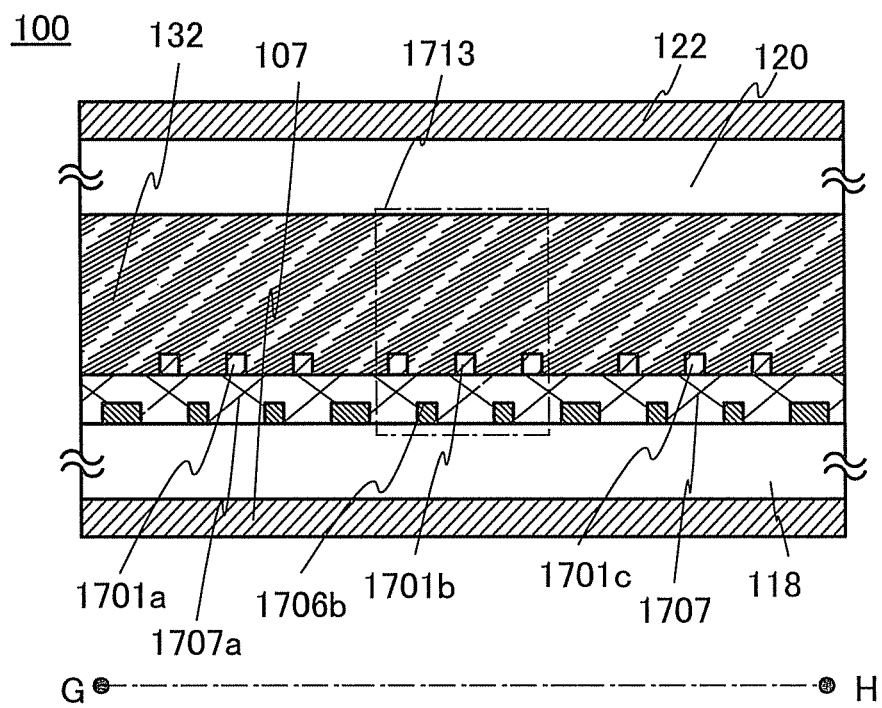

Next, the liquid crystal display device 100 in the case of a passive matrix type is described with reference to FIGS. 5A and 5B. Note that in the case of the passive matrix type, the liquid crystal display device 100 has a structure without the transistor element layer 123. FIG. 5A is a top view of the liquid crystal display device 100, and FIG. 5B is a cross-sectional view taken along line G-H in FIG. 5A. Although the liquid crystal 132, the counter substrate 120, the first polarizing member 107, the second polarizing member 122, and the like are omitted in FIG. 5A, these are provided as illustrated in FIG. 5B.

In the liquid crystal display device 100, the substrate 118 for which the first polarizing member 107 is provided and the counter substrate 120 for which the second polarizing member 122 is provided are adhered to face each other with the liquid crystal 132 provided therebetween. Common electrodes 1706a, 1706b, and 1706c, an insulating film 1707, and pixel electrodes 1701a, 1701b, and 1701c are provided between the substrate 118 and the liquid crystal 132. The pixel electrodes 1701a, 1701b, and 1701c are controlled by the common driver 105 (see FIG. 1B), and the common electrodes 1706a, 1706b, and 1706c are controlled by the segment driver 103 (see FIG. 1B).

The pixel electrodes 1701a, 1701b, and 1701c and the common electrodes 1706a, 1706b, and 1706c each have a shape with an opening pattern which includes a rectangular opening (slit) in a pixel region of a liquid crystal element 1713.

With an electric field formed between the pixel electrodes 1701a, 1701b, and 1701c and the common electrodes 1706a, 1706b, and 1706c, the liquid crystal 132 is controlled. In that case, an electric field in a lateral direction is applied to the liquid crystal 132, so that liquid crystal molecules can be controlled using the electric field. In addition, the liquid crystal molecules can be controlled in the direction parallel to the substrate, whereby a viewing angle can be increased. In a passive matrix liquid crystal display device, the favorable cell gap is the same as that of an active matrix liquid crystal display device.

In addition, monochrome display or color display with the use of a color filter can be performed in the passive matrix liquid crystal display device in the same manner as the active matrix liquid crystal display device. The color filter may be provided between the counter substrate 120 and the liquid crystal 132 or between the counter substrate 120 and the second polarizing member 122. The above-described light-transmitting resin may be used for the color filter.

The pixel electrodes 1701a, 1701b, and the 1701c and the common electrodes 1706a, 1706b, and 1706c may be formed using the above-described conductive material.

Although not shown, the spacer 415 can be used for keeping the cell gap, and the sealant 130 can be used for sealing the liquid crystal 132 in the same manner as the liquid crystal display device 100 of the active matrix type.

The first polarizing member 107 is provided on the outer side of the substrate 118 (on the side opposite to the liquid crystal 132) and the second polarizing member 122 is provided on the outer side of the counter substrate 120 (on the side opposite to the liquid crystal 132). In addition to the first polarizing member 107 and the second polarizing member 122, an optical film such as a retardation plate (including a retardation film) or an anti-reflection plate (including an anti-reflection film) may be provided.

In addition, a light-blocking layer (a black matrix) may be provided in the liquid crystal display device 100.

The light-blocking layer may be provided on the inner side (on the liquid crystal 132 side) of the pair of substrates (the substrate 118 and the counter substrate 120) which are adhered to each other with the liquid crystal 132 provided therebetween, or may be provided on the outer side than the pair of substrates (on the side opposite to the liquid crystal 132).

In the case where the light-blocking layer is provided on the inner side of the pair of substrates, the light-blocking layer may be provided for the substrate 118 for which the pixel electrodes are provided, or may be provided for the counter substrate 120. The light-blocking layer may be separately provided, or alternatively, in the case of active matrix type, the interlayer insulating film 413 that also functions as a light-blocking layer may be provided over the substrate 118 for which the transistor element layer 123 is provided.

The light-blocking layer is formed using a light-blocking material that reflects or absorbs light. The light-blocking layer can be formed using, for example, a black organic resin and may be formed by mixture of a black resin of a pigment material, carbon black, titanium black, or the like into a resin material such as photosensitive or non-photosensitive polyimide. Alternatively, a light-blocking metal film can be used, which is made of chromium, molybdenum, nickel, titanium, cobalt, copper, tungsten, or aluminum, for example.

There is no particular limitation on a method for forming the light-blocking layer, and a dry method such as an evaporation method, a sputtering method, or a CVD method or a wet method such as spin coating, dip coating, spray coating, a droplet discharging method (e.g., ink jetting, screen printing, or offset printing), may be used depending on the material. An etching method (dry etching or wet etching) may be employed as needed to form a desired pattern.

In the case where the light-blocking layer is used as part of the interlayer insulating film 413, it is preferable to use a black organic resin. The light-blocking layer is preferably provided in a region overlapping with the transistor element layer 123 (in particular, the semiconductor layer of the transistor or a contact hole for the pixel electrode 126) or in a region between pixels.

By providing the light-blocking layer, light incident on the transistor element layer 123 (in particular, the semiconductor layer of the transistor) can be blocked, and variation in the electrical characteristics of the transistor due to incident light can be suppressed to stabilize the electrical characteristics. Further, the light-blocking layer can prevent light leakage to an adjacent pixel, and can conceal display unevenness caused by light leakage or the like due to an alignment defect of liquid crystal which occurs easily over a contact hole. As a result, high definition and high reliability of the liquid crystal display device 100 can be achieved.

In this manner, a liquid crystal display device having high definition and good temperature characteristics in which color change can be corrected can be provided. In addition, owing to the good temperature characteristics, a liquid crystal display device which is suitable for outdoor use can be provided. Note that this embodiment can be combined with the structure disclosed in any of other embodiments and an example as appropriate.

Embodiment 2

In this embodiment, a transistor 430 provided in a liquid crystal display device 100 of an active matrix type and included in a transistor element layer 123 will be described (see FIG. 4B). Note that the transistor 430 is an inverted-staggered thin film transistor.

The transistor element layer 123 includes a transistor operated even at high temperature or the like, that is, having good temperature characteristics, and thus a semiconductor including a plurality of crystal regions is used as a semiconductor layer 408 of the transistor 430. As the semiconductor including a plurality of crystal regions, a microcrystalline silicon semiconductor, a polycrystalline silicon semiconductor, or the like is used. Further, not only a silicon semiconductor but also a germanium semiconductor may be used. Furthermore, an oxide semiconductor can also be used. Note that an oxide semiconductor refers to a metal oxide having semiconductor characteristics here. In this embodiment, manufacturing processes of an n-channel transistor including a microcrystalline silicon semiconductor in the semiconductor layer 408 is described.

Figure 6A:
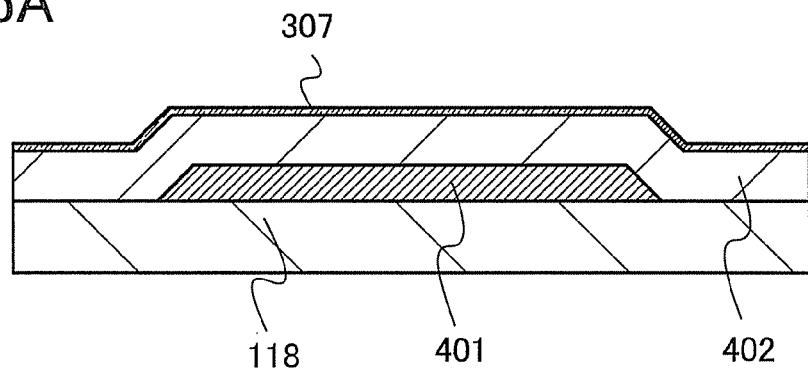
FIGS. 6A to 6D are cross-sectional views illustrating a method for manufacturing a thin film transistor included in a liquid crystal display device.

As illustrated in FIG. 6A, a gate electrode 401 is formed over a substrate 118. Then, a gate insulating film 402 which covers the gate electrode 401 (also referred to as a first gate electrode) is formed. A seed crystal 307 is formed over the gate insulating film 402.

As the substrate 118, a glass substrate; a ceramic substrate; a plastic substrate which has high heat resistance enough to withstand a process temperature of this manufacturing process; or the like can be used. In the case where the substrate does not need to have a light-transmitting property, a metal substrate, such as a stainless steel alloy substrate provided with an insulating film on its surface may be used. As the glass substrate, for example, an alkali-free glass substrate of barium borosilicate glass, aluminoborosilicate glass, aluminosilicate glass, or the like may be used. There is no limitation on the size of the substrate 118; for example, any of the 3rd to 10th generation glass substrates, which are often used in the field of the above-described flat panel display, can be used.

The gate electrode 401 can be formed as a single layer or a stacked layer using a metal material such as molybdenum, titanium, chromium, tantalum, tungsten, aluminum, copper, neodymium, scandium, or nickel or an alloy material which includes any of these materials as a main component. A semiconductor typified by polycrystalline silicon with an impurity element such as phosphorus doped, an AgPdCu alloy, an Al—Nd alloy, an Al—Ni alloy, or the like may be used as well.

For example, the following is preferable as a stacked structure of the gate electrode 401: a two-layer structure in which a molybdenum film is stacked over an aluminum film, a two-layer structure in which a molybdenum film is stacked over a copper film, a two-layer structure in which a titanium nitride film or a tantalum nitride film is stacked over a copper film, a two-layer structure in which a titanium nitride film and a molybdenum film are stacked, a two-layer structure in which a copper-magnesium alloy film including oxygen and a copper film are stacked, a two-layer structure in which a copper-manganese alloy film including oxygen and a copper film are stacked, a two-layer structure in which a copper-manganese alloy film and a copper film are stacked, or the like. As a three-layer structure, it is preferable to stack a tungsten film or a tungsten nitride film, an alloy film of aluminum and silicon or an alloy film of aluminum and titanium, and a titanium nitride film or a titanium film. By stacking a film functioning as a barrier film over a film having low electric resistance, electric resistance can be low and diffusion of a metal element from the metal film into the semiconductor film can be prevented.

The gate electrode 401 can be formed in the following manner: a conductive film is formed over the substrate 118 by a sputtering method or a vacuum evaporation method using the above-described metal material(s); a mask is formed over the conductive film by a photolithography method, an inkjet method, or the like; and the conductive film is etched using the mask. Alternatively, the gate electrode 401 can be formed by discharging a conductive nanopaste of silver, gold, copper, or the like over the substrate by an inkjet method and baking the conductive nanopaste. In order to improve adhesion between the gate electrode 401 and the substrate 118, a film of a nitride of any of the above-described metal materials may be provided between the substrate 118 and the gate electrode 401. In this embodiment, a conductive film is formed over the substrate 118 and etched using a mask made of a resist formed by a photolithography method, whereby the gate electrode 401 is formed.

The side surface of the gate electrode 401 is preferably tapered. This is because an insulating film, a semiconductor film, and a wiring formed over the gate electrode 401 in the subsequent manufacturing processes can be prevented from being cut in a step of the gate electrode 401. In order to taper the side surface of the gate electrode 401, etching may be performed while the resist mask is made to recede.

Through the process of forming the gate electrode 401, a gate wiring (a scan line) and a capacitor wiring 403 can also be formed at the same time as described in the above embodiment. The gate wiring means a wiring for selecting a pixel, while the capacitor wiring 403 means a wiring which is connected to one of electrodes of a storage capacitor in a pixel. However, without limitation thereto, either one or both of the gate wiring and the capacitor wiring 403 may be formed by a separate step from that of the gate electrode 401.

The gate insulating film 402 is formed as a single layer or a stacked layer using a silicon oxide film, a silicon oxynitride film, a silicon nitride film, a silicon nitride oxide film, an aluminum oxide film, an aluminum nitride film, an aluminum oxynitride film, or an aluminum nitride oxide film by a CVD method, a sputtering method, or the like.

The silicon oxynitride means silicon that contains more oxygen than nitrogen, and preferably contains, when measured using Rutherford backscattering spectrometry (RBS) and hydrogen forward scattering (HFS), oxygen, nitrogen, silicon, and hydrogen at concentrations ranging from 50 to 70 at. %, 0.5 to 15 at. %, 25 to 35 at. %, and 0.1 to 10 at. %, respectively. Further, the silicon nitride oxide means silicon that contains more nitrogen than oxygen, and preferably contains, when measured using RBS and HFS, oxygen, nitrogen, silicon, and hydrogen at concentrations ranging from 5 to 30 at. %, 20 to 55 at. %, 25 to 35 at. %, and 10 to 30 at. %, respectively. Note that percentages of contained nitrogen, oxygen, silicon, and hydrogen fall within the ranges given above, where the total number of atoms contained in the silicon oxynitride or the silicon nitride oxide is defined as 100 at. %.

By forming the gate insulating film 402 using an oxide insulating film such as a silicon oxide film or a silicon oxynitride film, fluctuation in threshold voltage of the thin film transistor can be suppressed.

The gate insulating film 402 can be formed by a CVD method, a sputtering method, or the like. In a process of forming the gate insulating film 402 by a CVD method, glow discharge plasma is generated by applying high-frequency power in the HF band with a frequency of 3 MHz to 30 MHz, typically 13.56 MHz or 27.12 MHz, or high-frequency power in the VHF band with a frequency greater than 30 MHz and less than or equal to about 300 MHz, typically 60 MHz. Alternatively, glow discharge plasma may be generated by applying high-frequency power with a microwave frequency of 1 GHz or more. A pulsed oscillation by which high-frequency power is applied in a pulsed manner or a continuous oscillation by which high-frequency power is applied continuously may be applied. Further, a high-frequency power in an HF band may be superimposed on the high-frequency power in the VHF band, so that unevenness of plasma even in a large-sized substrate can be reduced, whereby the uniformity can be improved, and the deposition rate can be increased. When the gate insulating film 402 is formed using a microwave plasma CVD apparatus with the frequency of 1 GHz or more, the dielectric strength between the gate electrode and a drain and source electrodes, of the thin film transistor can be improved, so that a highly reliable thin film transistor can be obtained.

Further, by forming a silicon oxide film by a CVD method using an organosilane gas as the gate insulating film 402, the crystallinity of the semiconductor film which is formed later can be improved, so that the on-state current and the field-effect mobility of the thin film transistor can be increased. As the organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

The seed crystal 307 can be formed under a first condition which allows mixed phase grains to be formed to have high crystallinity with a low grain density. The first condition is preferably a condition where a flow rate of hydrogen is greater than or equal to 50 times and less than or equal to 1000 times that of a deposition gas containing silicon or germanium so that the deposition gas is diluted, and a pressure in a process chamber is greater than 133 Pa and less than or equal to 13332 Pa (greater than 1 Torr and less than or equal to 100 Torr). The seed crystal 307 includes a space between the mixed phase grains. The mixed phase grain includes an amorphous semiconductor region and a crystallite which is a minute crystal which can be regarded as a single crystal. In some cases, the mixed phase grain may include a twin crystal.

In the case where a rare gas such as helium, argon, neon, krypton, or xenon is used as the source gas of the seed crystal 307, the crystallinity of the seed crystal 307 can be improved. Accordingly, the on-state current and the field-effect mobility of the thin film transistor are increased and the throughput of the thin film transistor can also be increased.

Figure 6B:
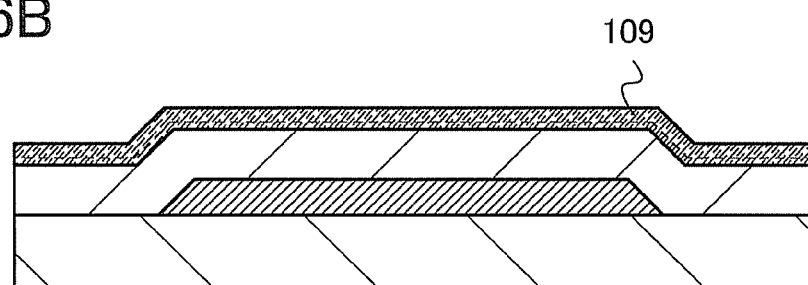

Then, as illustrated in FIG. 6B, a microcrystalline semiconductor film 109 is formed over the seed crystal 307. The microcrystalline semiconductor film 109 can be formed under a second condition which allows crystal growth of the mixed phase grains in the seed crystal 307 so that a space between the mixed phase grains is filled. In the second condition different from the first condition, it is preferable that the flow rate of hydrogen be greater than or equal to 50 times and less than or equal to 1000 times that of a deposition gas containing silicon or germanium and the pressure in the process chamber be greater than or equal to 133 Pa and less than or equal to 13332 Pa (greater than or equal to 1 Torr and less than or equal to 100 Torr). It is further preferable that a flow rate of hydrogen with respect to a flow rate of a deposition gas containing silicon or germanium and the pressure in the process chamber in the second condition be greater than those in the first condition. In addition, in the second condition, the flow ratio of the deposition gas containing silicon or germanium and hydrogen may be periodically increased and decreased while forming the microcrystalline semiconductor film 109.

A rare gas such as helium, argon, neon, krypton, or xenon is added to the source gas of the microcrystalline semiconductor film 109, whereby the crystallinity of the microcrystalline semiconductor film 109 can be improved similarly to that of the seed crystal 307. Thus, the on-state current and field-effect mobility of the thin film transistor are increased and the throughput of the thin film transistor can also be increased.

Next, a semiconductor film 111 is formed over the microcrystalline semiconductor film 109. The semiconductor film 111 includes a microcrystalline semiconductor region 111*a* and an amorphous semiconductor region 111*b*.

The semiconductor film 111 including the microcrystalline semiconductor region 111*a* and the amorphous semiconductor region 111*b* can be formed on such a condition that crystal growth is partly conducted (the crystal growth is suppressed) with the use of the microcrystalline semiconductor film 109 as a seed crystal.

The semiconductor film 111 is formed by glow discharge plasma with the use of a mixture of hydrogen, a gas containing nitrogen, and a deposition gas containing silicon or germanium in a process chamber of a plasma CVD apparatus. Examples of the gas containing nitrogen include ammonia, nitrogen, nitrogen fluoride, nitrogen chloride, chloroamine, fluoroamine, and the like. Glow discharge plasma may be generated as in the case of the seed crystal 307.

In that case, the flow ratio of the deposition gas containing silicon or germanium to hydrogen is the same as that for forming a microcrystalline semiconductor film like the seed crystal 307 or the microcrystalline semiconductor film 109, and the gas containing nitrogen is added as a source gas, whereby the degree of crystal growth can be suppressed as compared to that on either deposition condition for the seed crystal 307 or the microcrystalline semiconductor film 109. Specifically, at an early stage of deposition of the semiconductor film 111, the gas containing nitrogen included in the source gas partly suppresses the crystal growth, so that a conical microcrystalline semiconductor region or a pyramidal microcrystalline semiconductor region grows and an amorphous semiconductor region is formed. Further, at a middle stage or a later stage of the deposition, crystal growth in the conical or pyramidal microcrystalline semiconductor region stops, and is followed by deposition of only the amorphous semiconductor region. Accordingly, in the semiconductor film 111, the microcrystalline semiconductor region 111*a* and the amorphous semiconductor region 111*b* which is formed using a well-ordered semiconductor film having fewer defects and a steep tail of a level at a band edge in the valence band, can be formed.

Here, a typical example of the condition for forming the semiconductor film 111 is as follows: the flow rate of hydrogen is 10 to 2000 times, preferably 10 to 200 times as high as that of the deposition gas containing silicon or germanium. Note that in a typical example of a condition for forming a normal amorphous semiconductor film, the flow rate of hydrogen is 0 to 5 times as high as that of the deposition gas containing silicon or germanium.

A rare gas such as helium, argon, neon, krypton, or xenon may be added into the source gas of the semiconductor film 111, so that the deposition rate can be increased.

It is preferable that the thickness of the semiconductor film 111 be 50 nm to 350 nm, far preferably 120 nm to 250 nm.

Next, an impurity semiconductor film 113 is formed over the semiconductor film 111. Then, a resist mask 115 is formed over the impurity semiconductor film 113 (see FIG. 6C).

Figure 6C:
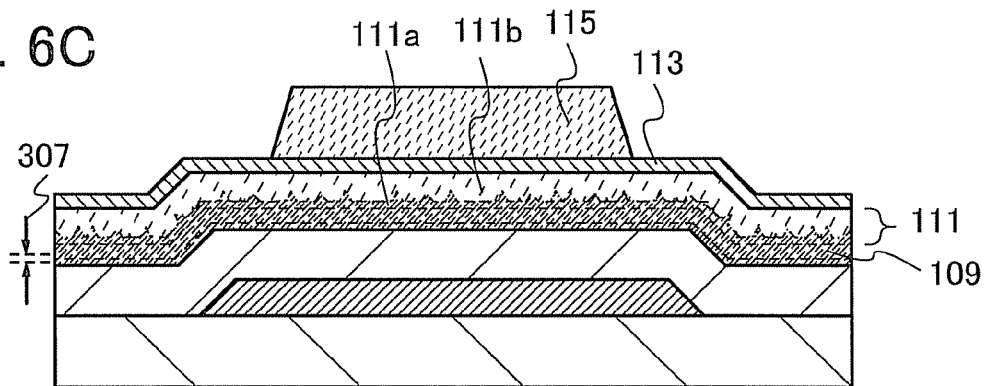
Figure 7A:
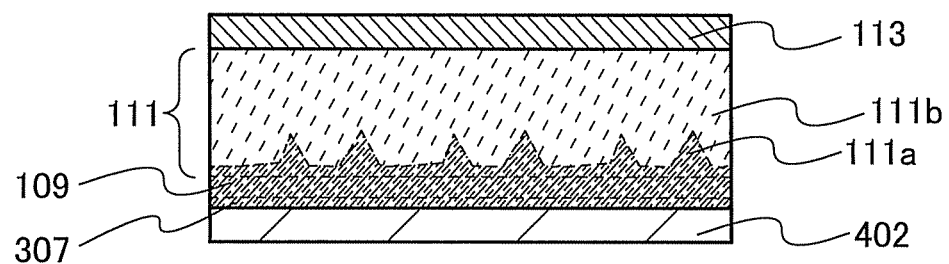
FIGS. 7A and 7B are cross-sectional views illustrating a method for manufacturing a thin film transistor included in a liquid crystal display device.
Figure 7B:
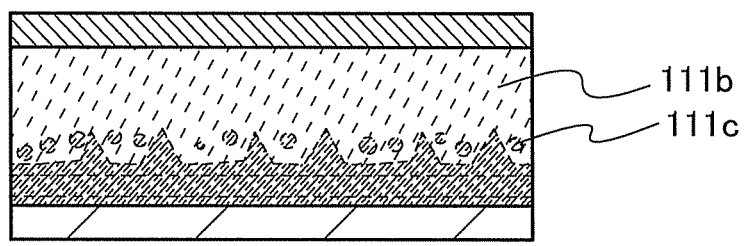

FIGS. 7A and 7B are enlarged views of the portion between the gate insulating film 402 and the impurity semiconductor film 113 illustrated in FIG. 6C.

As illustrated in FIG. 7A, the microcrystalline semiconductor region 111*a* in the semiconductor film 111 has a projection and/or a depression; the microcrystalline semiconductor region 111*a* has a projecting (conical or pyramidal) shape whose width decreases from the gate insulating film 402 toward the amorphous semiconductor region 111*b* (a tip of the projected portion has an acute angle). Alternatively, the microcrystalline semiconductor region 111*a* may have a projecting (inverted conical or pyramidal) shape whose width increases from the gate insulating film 402 toward the amorphous semiconductor region 111*b*.

The thickness of the microcrystalline semiconductor region 111*a*, that is, the distance from the interface between the gate insulating film 402 and the microcrystalline semiconductor film 109 to the tip of the projection of the microcrystalline semiconductor region 111*a* may be set to greater than or equal to 5 nm and less than or equal to 310 nm, so that the off-state current of the thin film transistor can be reduced.

Further, in order to improve the crystallinity of the microcrystalline semiconductor region 111*a*, it is preferable that the concentrations of oxygen contained in the semiconductor film 111, which are measured by secondary ion mass spectrometry, be less than $1 \times 10^{18}$ atoms/cm$^3$. The nitrogen concentration profile of the semiconductor film 111 that is measured by secondary ion mass spectrometry has a peak concentration greater than or equal to $1 \times 10^{20}$ atoms/cm$^3$ and less than or equal to $1 \times 10^{21}$ atoms/cm$^3$, preferably greater than or equal to $2 \times 10^{20}$ atoms/cm$^3$ and less than or equal to $1 \times 10^{21}$ atoms/cm$^3$.

The amorphous semiconductor region 111*b* is formed using an amorphous semiconductor containing nitrogen. Nitrogen of the amorphous semiconductor containing nitrogen may exist, for example, as an NH group or an NH$_2$ group. The amorphous semiconductor is formed using amorphous silicon.

The amorphous semiconductor containing nitrogen is a semiconductor having a less amount of the defect absorption spectrum and lower energy at an Urbach edge, measured by a constant photocurrent method (CPM) or photoluminescence spectroscopy, compared to a conventional amorphous semiconductor. That is, as compared to the conventional amorphous semiconductor, the amorphous semiconductor containing nitrogen is a well-ordered semiconductor which has few defects and whose tail of a level at a band edge in the valence band is steep. Since the amorphous semiconductor containing nitrogen has a steep tail of a level at a band edge in the valence band, the band gap gets wider and less tunneling current flows. Therefore, the amorphous semiconductor containing nitrogen is provided between the microcrystalline semiconductor region 111a and the impurity semiconductor film 113, whereby the off-state current of the thin film transistor can be reduced. In addition, by providing the amorphous semiconductor containing nitrogen, the on-state current and the field-effect mobility of the thin film transistor can be increased.

Further, the peak region of a spectrum of the amorphous semiconductor containing nitrogen, obtained by performing low-temperature photoluminescence spectroscopy is greater than or equal to 1.31 eV and less than or equal to 1.39 eV. Note that the peak of a spectrum of a microcrystalline semiconductor, typically microcrystalline silicon, obtained by performing low-temperature photoluminescence spectroscopy is greater than or equal to 0.98 eV and less than or equal to 1.02 eV. Therefore, the amorphous semiconductor containing nitrogen is different from a microcrystalline semiconductor.

Further, like the amorphous semiconductor region 111b, the microcrystalline semiconductor region 111a may also contain an NH group or an $NH_2$ group.

Further, as illustrated in FIG. 7B, a semiconductor mixed phase grain 111c whose grain size is greater than or equal to 1 nm and less than or equal to 10 nm, preferably greater than or equal to 1 nm and less than or equal to 5 nm may be included in the amorphous semiconductor region 111b, so that the on-state current and the filed-effect mobility of the thin film transistor can be further increased.

The microcrystalline semiconductor having a projected (conical or pyramidal) shape whose width decreases from the gate insulating film 402 toward the amorphous semiconductor region 111b is fainted in the following manner: after the microcrystalline semiconductor film is formed under the condition for depositing a microcrystalline semiconductor, crystal growth is performed on such a condition that the crystal growth is gradually suppressed, and an amorphous semiconductor is deposited.

Since the microcrystalline semiconductor region 111a of the semiconductor film 111 has the conical or pyramidal shape or the inverted conical or pyramidal shape, resistance in the vertical direction (film thickness direction) of when voltage is applied between the source and drain electrodes in an on state, i.e., resistance of the semiconductor film 111 can be reduced. Further, less tunneling current flows by the provision of the amorphous semiconductor containing nitrogen between the microcrystalline semiconductor region 111a and the impurity semiconductor film 113 because the amorphous semiconductor is a well-ordered semiconductor which has fewer defects and whose tail of a level at a band edge in the valence band is steep. In this manner, in the thin film transistor described in this embodiment, the on-state current and the field-effect mobility of the thin film transistor can be increased and the off-state current can be reduced.

Here, the semiconductor film 111 including the microcrystalline semiconductor region 111a and the amorphous semiconductor region 111b is formed using the source gas including the gas containing nitrogen. Alternatively, the semiconductor film 111 including the microcrystalline semiconductor region 111a and the amorphous semiconductor region 111b may be formed in the following manner: the surface of the microcrystalline semiconductor film 109 is exposed to a gas containing nitrogen so that nitrogen is adsorbed to the surface of the microcrystalline semiconductor film 109; and then deposition is performed using a deposition gas containing silicon or germanium and hydrogen as a source gas.

The impurity semiconductor film 113 is formed using amorphous silicon to which phosphorus is added, microcrystalline silicon to which phosphorus is added, or the like. Amorphous silicon to which phosphorus is added and microcrystalline silicon to which phosphorus is added may be stacked. In the case of forming a p-channel thin film transistor as a thin film transistor, the impurity semiconductor film 113 is formed using microcrystalline silicon to which boron is added, amorphous silicon to which boron is added, or the like. In the case where the semiconductor film 111 achieves an ohmic contact with the source electrode 405a and the drain electrode 405b to be formed later, the impurity semiconductor film 113 is not necessarily formed.

The impurity semiconductor film 113 is formed by glow discharge plasma with the use of a mixture of hydrogen, phosphine (diluted with hydrogen or silane), and a deposition gas containing silicon in a reaction chamber of the plasma CVD apparatus. Accordingly, amorphous silicon to which phosphorus is added or microcrystalline silicon to which phosphorus is added is formed. In the case of forming a p-channel thin film transistor, the impurity semiconductor film 113 may be formed by glow discharge plasma using diborane instead of phosphine.

In the case where the impurity semiconductor film 113 is formed using amorphous silicon to which phosphorus is added or microcrystalline silicon to which boron is added, a microcrystalline semiconductor film, typically a microcrystalline silicon film may be formed between the semiconductor film 111 and the impurity semiconductor film 113, so that characteristics of the interface can be improved. Accordingly, the resistance in the interface between the impurity semiconductor film 113 and the semiconductor film 111 can be suppressed. Consequently, the amount of current flowing through the source region, the semiconductor film, and the drain region of the thin film transistor can be increased, which enables the on-state current and the field-effect mobility of the thin film transistor to be improved.

The resist mask 115 can be formed by a photolithography step.

Next, the seed crystal 307, the microcrystalline semiconductor film 109, the semiconductor film 111, and the impurity semiconductor film 113 are etched using the resist mask 115. Through this step, the seed crystal 307, the microcrystalline semiconductor film 109, the semiconductor film 111, and the impurity semiconductor film 113 are divided into elements, so that an island-shaped semiconductor stack 117 and an island-shaped impurity semiconductor film 121 are formed. The semiconductor stack 117 includes a microcrystalline semiconductor region 117a and an amorphous semiconductor region 117b. The microcrystalline semiconductor region 117a includes the seed crystal 307, the microcrystalline semiconductor film 109, and the microcrystalline semiconductor region 111a of the semiconductor film 111. The amorphous semiconductor region 117b includes the amorphous semiconductor region 111b of the semiconductor film 111. Then, the resist mask 115 was removed (see FIG. 6D).

Figure 8A:
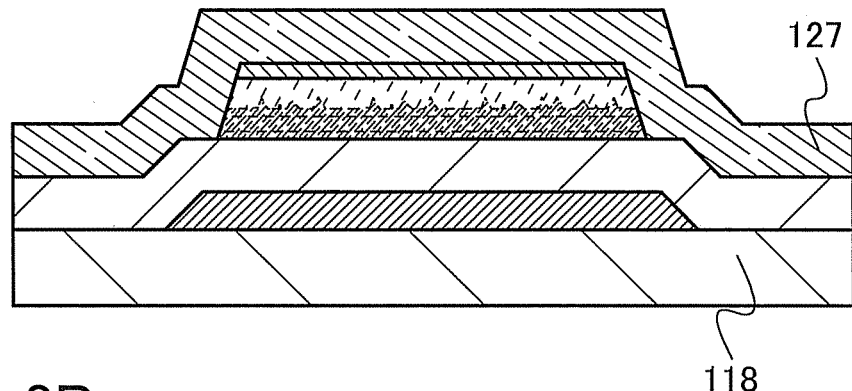
FIGS. 8A to 8C are cross-sectional views illustrating a method for manufacturing a thin film transistor included in a liquid crystal display device.

Next, a conductive film 127 is formed over the impurity semiconductor film 121 (see FIG. 8A). The conductive film 127 can be formed in a manner similar to the conductive film which functions as the gate electrode 401.

Figure 8B:
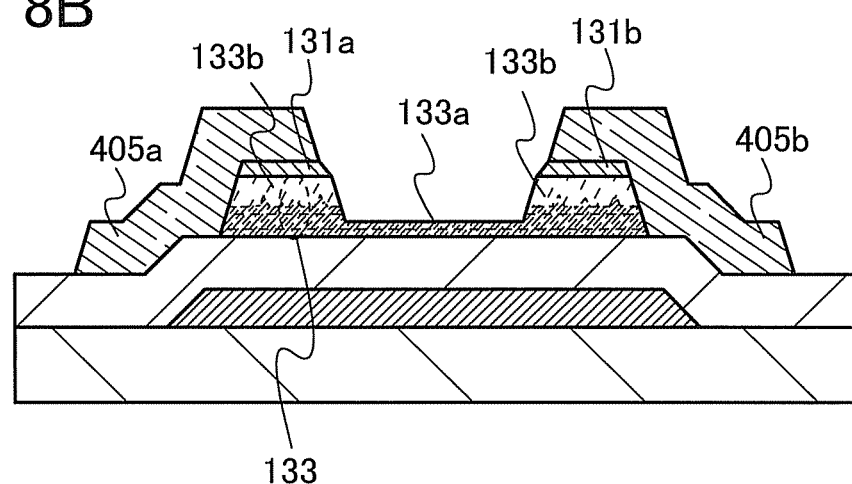

Next, a resist mask is formed by a photolithography step, and the conductive film 127 is etched with the use of the resist mask to form the source electrode 405a and the drain electrode 405b (see FIG. 8B). The etching of the conductive film 127 may be either dry etching or wet etching. The source electrode 405a and the drain electrode 405b also function as a source and drain wirings (a signal line). However, without limitation thereto, a signal line may be provided separately from the source and drain electrodes.

Next, the impurity semiconductor film 121 and part of the semiconductor stack 117 are etched, so that a pair of impurity semiconductor films 131a and 131b functioning as a source region and a drain region and a semiconductor stack 133 including a microcrystalline semiconductor region 133a and a pair of amorphous semiconductor regions 133b are formed. The etching of the semiconductor stack 117 is performed so that the microcrystalline semiconductor region 133a is exposed, whereby the semiconductor stack 133 is formed in which the microcrystalline semiconductor region 133a and the amorphous semiconductor regions 133b are stacked in a region which is covered with the source electrode 405a and the drain electrode 405b, and the microcrystalline semiconductor region 133a is exposed in a region which is not covered with the source electrode 405a and the drain electrode 405b but overlaps with the gate electrode.

Dry etching is used here, so that the ends of the source electrode 405a and the drain electrode 405b are aligned with the ends of the impurity semiconductor films 131a and 131b, respectively. However, when the conductive film 127 is etched by wet etching and the impurity semiconductor film 121 is etched by dry etching, the ends of the source electrode 405a and the drain electrode 405b are deviated from the ends of the impurity semiconductor films 131a and 131b, respectively, so that in a cross section, the ends of the source electrode 405a and the drain electrode 405b are positioned on the inner side than the ends of the impurity semiconductor films 131a and 131b.

Dry etching may be further performed on the surfaces of the microcrystalline semiconductor region 133a and the amorphous semiconductor regions 133b after the etching step. The dry etching is performed in the following condition: the exposed microcrystalline semiconductor region 133a and the exposed amorphous semiconductor regions 133b are not damaged and etching rates with respect to the microcrystalline semiconductor region 133a and the amorphous semiconductor regions 133b are low. In other words, such a condition that almost no damage is given to the exposed surfaces of the microcrystalline semiconductor region 133a and the amorphous semiconductor regions 133b and the thicknesses of the exposed microcrystalline semiconductor region 133a and the exposed amorphous semiconductor regions 133b are hardly reduced is used. As an etching gas, $Cl_2$, $CF_4$, $N_2$, or the like is typically used. There is no particular limitation on an etching method; an inductively coupled plasma (ICP) method, a capacitively coupled plasma (CCP) method, an electron cyclotron resonance (ECR) method, a reactive ion etching (RIE) method, or the like can be used.

Next, the surfaces of the microcrystalline semiconductor region 133a and the amorphous semiconductor regions 133b are subjected to plasma treatment, typically, water plasma treatment, oxygen plasma treatment, ammonia plasma treatment, nitrogen plasma treatment, plasma treatment using a mixed gas of oxygen and hydrogen, or the like.

The water plasma treatment can be performed by generating plasma using a gas containing water as its main component typified by water vapor ($H_2O$ vapor), introduced into a reaction space. After that, the resist mask is removed. The resist mask may be removed before the dry etching on the impurity semiconductor film 121 and the semiconductor stack 117.

Further, the dry etching is further performed under the condition that no damage is given to the microcrystalline semiconductor region 133a and the amorphous semiconductor regions 133b, whereby impurity such as a residue existing on the exposed microcrystalline semiconductor region 133a and the exposed amorphous semiconductor regions 133b can be removed. Further, the water plasma treatment follows the dry etching to be performed, whereby a residue of the resist mask can be removed and a defect of the microcrystalline semiconductor region 133a can be reduced. Moreover, by the plasma treatment, insulation between the source region and the drain region can be ensured, and thus, the off-state current of the thin film transistor can be reduced, and variation in electric characteristics can be reduced.

Note that in FIGS. 8A and 8B, a method different from the above processes may be used. For example, a resist mask is formed over the conductive film 127 by the photolithography step, and then the conductive film 127 is etched using the resist mask, so that the source electrode 405a and the drain electrode 405b are formed. Next, the impurity semiconductor film 121 is etched, so that a pair of impurity semiconductor films 131a and 131b serving as a source region and a drain region are formed. At this time, part of the semiconductor stack 117 is etched in some cases. Next, the resist mask is removed, and then the semiconductor stack 133 including the microcrystalline semiconductor region 133a and the pair of amorphous semiconductor regions 133b may be formed by etching part of the semiconductor stack 117.

As a result of this, since the microcrystalline semiconductor region 117a is covered with the amorphous semiconductor region 117b in the step of removing the resist mask, the microcrystalline semiconductor region 117a is prevented from being in contact with the resist stripper and a residue of the resist. Further, since the amorphous semiconductor region 117b is etched using the source electrode 405a and the drain electrode 405b to expose the microcrystalline semiconductor region 133a after the mask is removed, the amorphous semiconductor region which is in contact with the resist stripper and a residue of the resist mask is not left in a back channel. Consequently, a leak current due to the resist stripper and a residue of the resist mask left in a back channel are not generated, which can further reduce the off-state current of the thin film transistor.

Through the above-described process, the thin film transistor operated even at high temperature or the like, that is, the thin film transistor having good temperature characteristics can be manufactured.

Next, an insulating film 407 (also referred to as a second gate insulating film) is formed over the semiconductor stack 133, the source electrode 405a, and the drain electrode 405b. The insulating film 407 can be fondled in a manner similar to that for the gate insulating film 402.

Figure 8C:
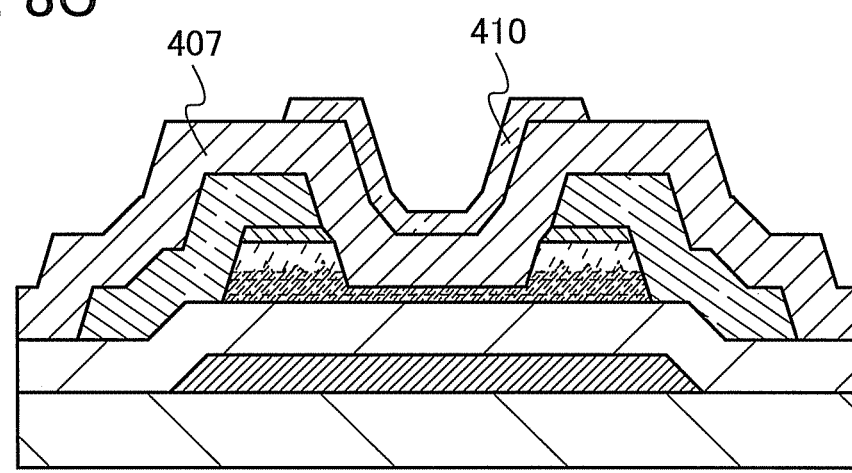

Next, a back-gate electrode 410 (also referred to as a second gate electrode) is formed over the insulating film 407 (see FIG. 8C). Through the above-described processes, the dual-gate thin film transistor can be manufactured.

The back-gate electrode 410 can be formed in a manner similar to that of the gate electrode 401. Further, the back-gate electrode 410 may be formed using a light-transmitting conductive material such as indium oxide including tungsten oxide, indium zinc oxide including tungsten oxide, indium oxide including titanium oxide, indium tin oxide including titanium oxide, indium tin oxide, indium zinc oxide, or indium tin oxide to which silicon oxide is added.

Alternatively, the back-gate electrode 410 can be formed using a conductive composition including a conductive high molecule having a light-transmitting property (also referred to as a conductive polymer). The back-gate electrode 410 preferably has a sheet resistivity of less than or equal to 10000 Ω/sq. and a light transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive high molecule can be used. For example, polyaniline or a derivative thereof, polypyrrole or a derivative thereof, polythiophene or a derivative thereof, or a copolymer of a monomer of two or more of aniline, pyrrole, and thiophene can be given.

The back-gate electrode 410 can be formed in the following manner: a conductive film is formed using the material described above by a sputtering method; and the conductive film is etched using a resist mask that is formed by a photolithography step. Alternatively, a conductive composition including a conductive high molecule having a light-transmitting property is formed by a coating method or a printing method, and baked to form the back-gate electrode 410.

Next, a form of the back-gate electrode is described with reference to FIGS. 9A to 9D that are top views of thin film transistors.

Figure 9A:
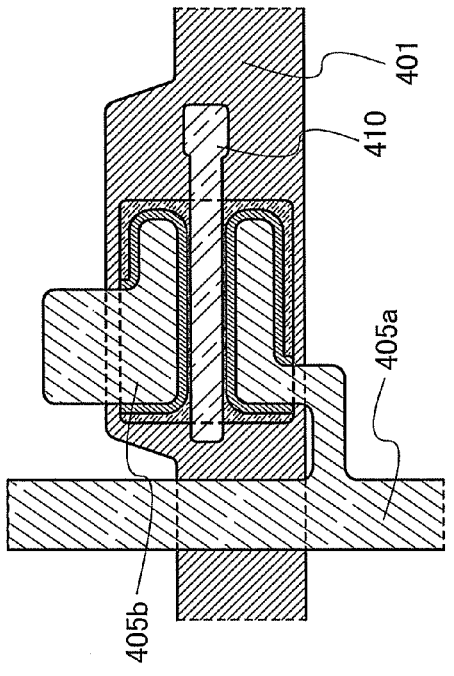
FIGS. 9A to 9D are top views illustrating a method for manufacturing a thin film transistor included in a liquid crystal display device.

As illustrated in FIG. 9A, the back-gate electrode 410 can be formed in parallel to the gate electrode 401. In that case, potentials applied to the back-gate electrode 410 and the gate electrode 401 can be controlled separately as appropriate. Thus, the threshold voltage of the thin film transistor can be controlled. Further, regions in which carriers flow, that is, channel regions, are formed on the gate insulating film 402 side and on the insulating film 407 side in the microcrystalline semiconductor region; thus, the on-state current of the thin film transistor can be increased.

Figure 9C:
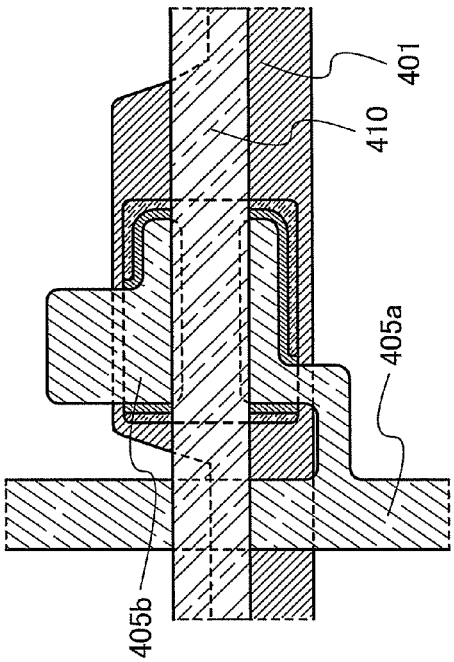
Figure 9B:
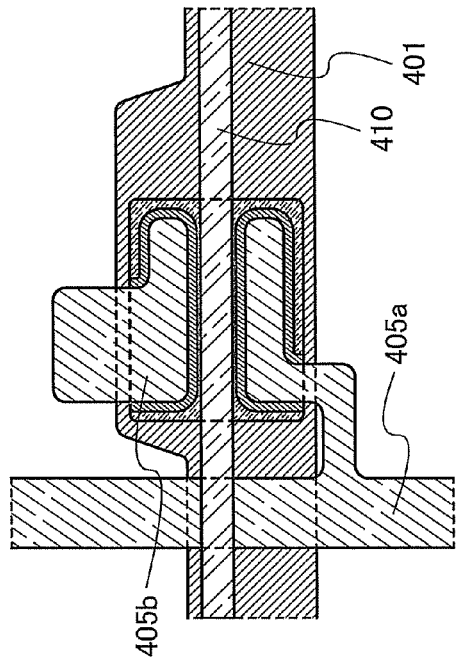

Note that although the below three patterns are not shown in the above embodiment, as illustrated in FIG. 9B, the back-gate electrode 410 can be connected to the gate electrode 401. That is, the gate electrode 401 and the back-gate electrode 410 can be connected through an opening portion 150 formed in the gate insulating film 402 and the insulating film 407. In that case, potential applied to the back-gate electrode 410 is equal to potential applied to the gate electrode 401. As a result, in the microcrystalline semiconductor region in the semiconductor layer, regions in which carriers flow, that is, channel regions are formed on the gate insulating film 402 side and on the insulating film 407 side; thus, the on-state current of the thin film transistor can be increased.

Further alternatively, as illustrated in FIG. 9C, the back-gate electrode 410 is not necessarily connected to the gate electrode 401 but may be in a floating state. In that case, channel regions are formed on the gate insulating film 402 side and on the insulating film 407 side in the microcrystalline semiconductor region without applying potential to the back-gate electrode 410; thus, the on-state current of the thin film transistor can be increased.

Figure 9D:
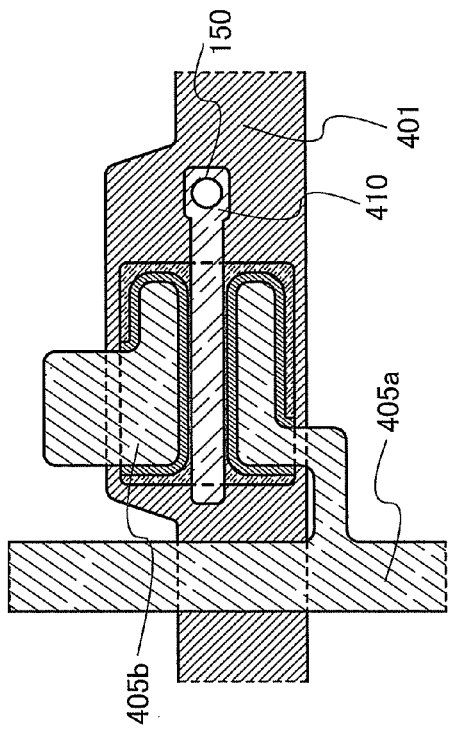

As illustrated in FIG. 9D, the back-gate electrode 410 may overlap with the source electrode 405a and the drain electrode 405b with the insulating film 407 provided therebetween. Although FIG. 9D illustrates the case using the back-gate electrode 410 illustrated in FIG. 9A, the back-gate electrode 410 of FIG. 9B or FIG. 9C may overlap with the source electrode 405a and the drain electrode 405b as well.

In the single-gate thin film transistor and the dual-gate thin film transistor described in this embodiment, a channel region is formed by the microcrystalline semiconductor film the crystallinity of which is increased by reducing the space between mixed phase grains. Because of this, the move amount of carriers is increased, so that the on-state current and the field-effect mobility of the single-gate thin film transistor and the dual-gate thin film transistor can be increased. Furthermore, since the amorphous semiconductor regions 133b is provided between the microcrystalline semiconductor region 133a and the impurity semiconductor film 131a and between the microcrystalline semiconductor region 133a, and the impurity semiconductor film 131b, the off-state current of the thin film transistor can be reduced. Accordingly, the area of the thin film transistor can be reduced, which enables high integration into a semiconductor device. Further, by using the thin film transistor described in this embodiment for a driver circuit of a display device, the area of the driver circuit can be decreased, which enables the frame size of the display device to be decreased.

Through the above-described process, the single-gate thin film transistor and the dual-gate thin film transistor operated even at high temperature or the like, that is, the single-gate thin film transistor and the dual-gate thin film transistor having good temperature characteristics can be manufactured.

This embodiment can be used in combination with other embodiments and an example, as appropriate.

Embodiment 3

Figure 10:
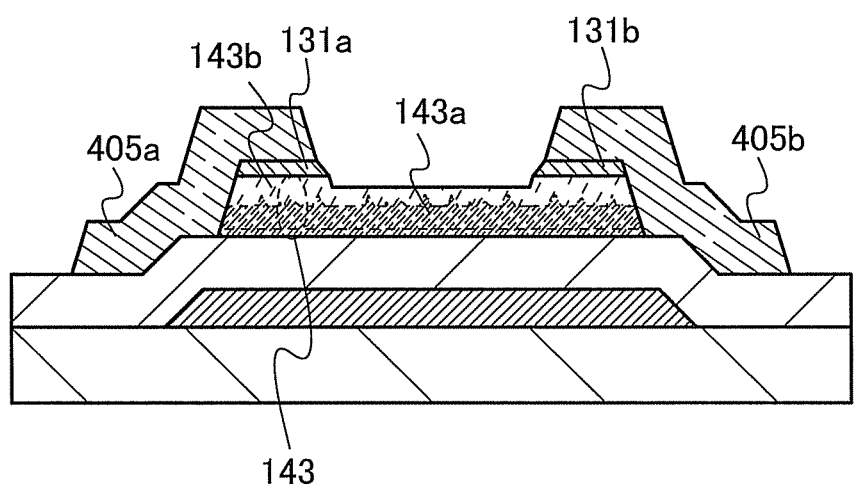
FIG. 10 is a cross-sectional view illustrating a method for manufacturing a thin film transistor included in a liquid crystal display device.

In this embodiment, a manufacturing method of a thin film transistor which has a different structure from the thin film transistor described in Embodiment 2 is described with reference to FIGS. 6A to 6D, FIGS. 8A to 8C and FIG. 10. FIG. 10 corresponds to the step illustrated in FIG. 8B.

In a manner similar to Embodiment 2, through the processes illustrated in FIGS. 6A to 6D and FIG. 8A, a conductive film 127 is formed.

Then, as illustrated in FIG. 10, a source electrode 405a and a drain electrode 405b are formed and an impurity semiconductor film 121 and a semiconductor stack 117 are partly etched, so that pair of impurity semiconductor films 131a and 131b serving as a source region and a drain region is formed as in Embodiment 2. In addition, a semiconductor stack 143 including a microcrystalline semiconductor region 143a and an amorphous semiconductor region 143b is formed. At this time, by etching the semiconductor stack 117 so that the amorphous semiconductor region 143b is exposed, the semiconductor stack 143 is formed in which the microcrystalline semiconductor region 143a and the amorphous semiconductor region 143b are stacked in regions which are covered with the source electrode 405a and the drain electrode 405b, and the microcrystalline semiconductor region 143a is not exposed but the amorphous semiconductor region 143b is exposed in a region which is not covered with the source electrode 405a and the drain electrode 405b but overlaps with the gate electrode. Note that the etching amount of the semiconductor stack 117 here is smaller than that of FIG. 8B.

The subsequent processes are similar to those in Embodiment 2.

Through the above-described processes, a single-gate thin film transistor can be manufactured. Since the back channel side of the thin film transistor is amorphous, the off-state current can be low as compared to the thin film transistor illustrated in FIG. 8B.

Further, in this embodiment, after the process of FIG. 10, a back-gate electrode 410 may be formed through an insulating film 407 in a manner similar to the process illustrated in FIG. 8C.

In the thin film transistors described in this embodiment and Embodiment 2, as a semiconductor layer, an amorphous oxide semiconductor or an oxide semiconductor including a plurality of crystalline regions may be used. Note that it is acceptable as long as the oxide semiconductor has a non-single crystalline structure.

The oxide semiconductor can be formed using an In—Ga—Zn-based metal oxide which contains In, Ga, and Zn and has a structure represented as $InMO_3(ZnO)_m$ (m>0). Note that M denotes one or a plurality of metal elements selected from gallium (Ga), iron (Fe), nickel (Ni), manganese (Mn), and cobalt (Co). As an example, M may be Ga or may include the above metal element in addition to Ga, for example, M may be Ga and Ni or Ga and Fe. Moreover, in the above oxide semiconductor, in some cases, a transition metal element such as Fe or Ni or an oxide of the transition metal is contained as an impurity element in addition to a metal element contained as M. In addition, a metal oxide contained in the metal oxide target have a relative density of higher than or equal to 80%, preferably higher than or equal to 95%, more preferably higher than or equal to 99.9% is used.

Further specifically, a four-component metal oxide such as an In—Sn—Ga—Zn-based metal oxide; a three-component metal oxide such as an In—Ga—Zn-based metal oxide, an In—Sn—Zn-based metal oxide, an In—Al—Zn-based metal oxide, a Sn—Ga—Zn-based metal oxide, an Al—Ga—Zn-based metal oxide, a Sn—Al—Zn-based metal oxide, an In—Hf—Zn-based metal oxide, an In—La—Zn-based metal oxide, an In—Ce—Zn-based metal oxide, an In—Pr—Zn-based metal oxide, an In—Nd—Zn-based metal oxide, an In—Sm—Zn-based metal oxide, an In—Eu—Zn-based metal oxide, an In—Gd—Zn-based metal oxide, an In—Tb—Zn-based metal oxide, an In—Dy—Zn-based metal oxide, an In—Ho—Zn-based metal oxide, an In—Er—Zn-based metal oxide, an In—Tm—Zn-based metal oxide, an In—Yb—Zn-based metal oxide, or an In—Lu—Zn-based metal oxide; a two-component metal oxide such as an In—Zn-based metal oxide, a Sn—Zn-based metal oxide, an Al—Zn-based metal oxide, a Zn—Mg-based metal oxide, a Sn—Mg-based metal oxide, an In—Mg-based metal oxide, or an In—Ga-based metal oxide; or a metal oxide containing indium, tin, zinc or the like can be used to form the oxide semiconductor. Note that in the above-described metal oxides, for example, an In—Ga—Zn-based metal oxide means an oxide containing In, Ga, and Zn as its main component and there is no particular limitation on the ratio of In, Ga, and Zn. Further, a metal element in addition to In, Ga, and Zn may be contained.

The oxide semiconductor can be formed by a sputtering method, a molecular beam epitaxy method, an atomic layer deposition method, a pulsed laser deposition method, a coating method, a printing method, or the like.

Manufacturing processes other than the process for forming the oxide semiconductor are the same in the processes described in this embodiment and those described in Embodiment 2.

Further, in the case of using an oxide semiconductor, heat treatment is performed as appropriate during the manufacturing process so that the hydrogen content in the oxide semiconductor layer can be reduced, oxygen deficiency in the oxide semiconductor can be compensated, and reduction in off-state current and improvement in electrical characteristics are possible.

Through the above-described process, the thin film transistor operated even at high temperature or the like, that is, the thin film transistor having good temperature characteristics can be manufactured.

This embodiment can be used in combination with other embodiments and an example, as appropriate.

Embodiment 4

A liquid crystal display device disclosed in this specification can be applied to an electronic book reader (an e-book reader), a public information display (PID), an advertisement in a vehicle such as a train, displays of various cards such as a credit card, and the like. Specifically, the liquid crystal display device disclosed in this specification has high definition and few changes in a color tone in severe environments such as at high temperature or low temperature. Therefore, it is effectively used for digital signage, which is required to be operated at high temperature such as in the outdoors when the weather is sunny or the like. Examples of the electronic devices are illustrated in FIGS. 11A and 11B.

Figure 11A:
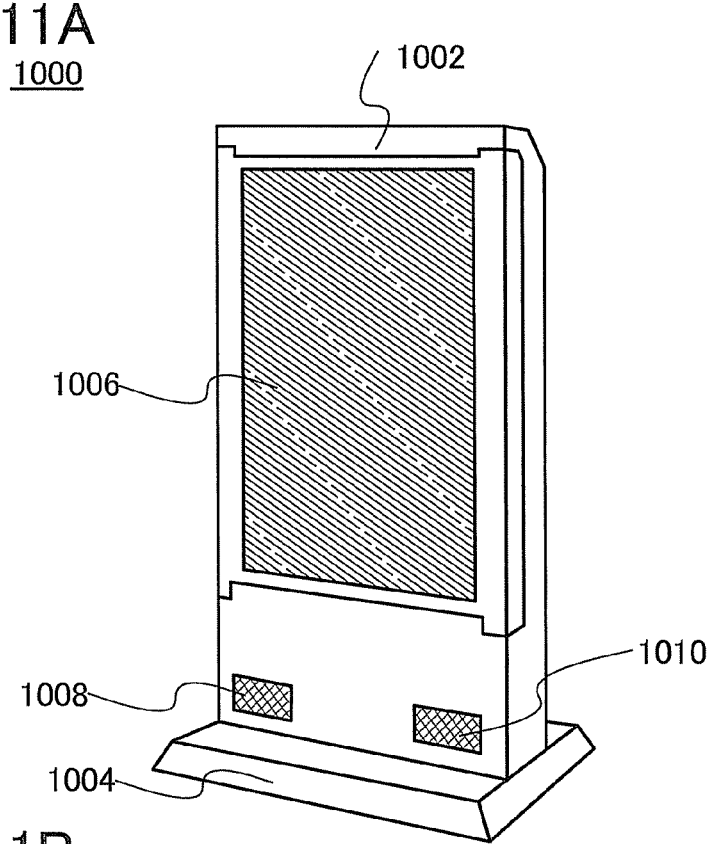
FIGS. 11A and 11B illustrate an example of digital signage and an example of an electronic book reader, respectively.
Figure 11B:
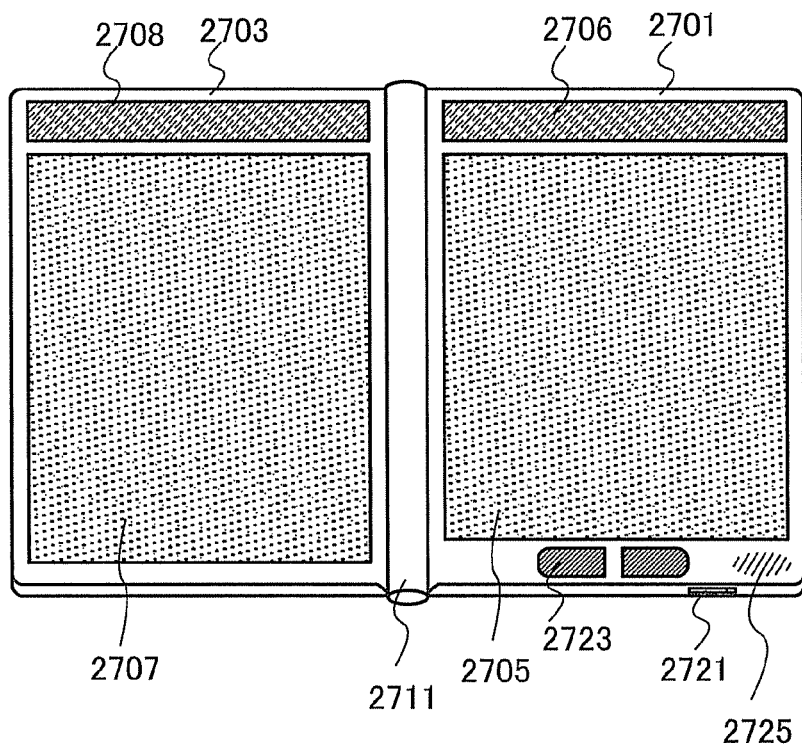

FIG. 11A illustrates an example of digital signage. For example, digital signage 1000 includes two housings, a housing 1002 and a housing 1004. The housing 1002 includes a display portion 1006 and two speakers, a speaker 1008 and a speaker 1010.

The liquid crystal display device that is an embodiment of the present invention can be used for the display portion 1006, and as described in the above embodiment, the liquid crystal display device can correct a change in a color tone which is caused by a refractive index of liquid crystal even at high temperature such as in the outdoors when the weather is sunny, so that a high-definition images can be displayed.

Further, in addition to the above structure, another, structure in which a sensor is provided so that an image is not displayed when a person is not close to the liquid crystal display device or the like may be provided.

FIG. 11B illustrates an example of an electronic book reader. For example, an electronic book reader 2700 includes two housings, a housing 2701 and a housing 2703. The housing 2701 and the housing 2703 are combined with a hinge 2711 so that the electronic book reader 2700 can be opened and closed with the hinge 2711 as an axis. With such a structure, the electronic book reader 2700 can operate like a paper book.

A display portion 2705 and a photoelectric conversion device 2706 are incorporated in the housing 2701. A display portion 2707 and a photoelectric conversion device 2708 are incorporated in the housing 2703. The display portion 2705 and the display portion 2707 may display one image or different images. In the case where the display portion 2705 and the display portion 2707 display different images, for example, text can be displayed on a display portion on the right side (the display portion 2705 in FIG. 11B) and graphics can be displayed on a display portion on the left side (the display portion 2707 in FIG. 11B).

FIG. 11B illustrates an example in which the housing 2701 is provided with an operation portion and the like. For example, the housing 2701 is provided with a power switch 2721, an operation key 2723, a speaker 2725, and the like. With the operation key 2723, pages can be turned. Note that a keyboard, a pointing device, or the like may also be provided on the surface of the housing, on which the display portion is provided. Furthermore, an external connection terminal (an earphone terminal, a USB terminal, a terminal that can be connected to an AC adapter and various cables such as a USB cable, or the like), a recording medium insertion portion, and the like may be provided on the back surface or the side surface of the housing. Moreover, the electronic book reader 2700 may have a function of an electronic dictionary.

The electronic book reader 2700 may have a structure capable of wirelessly transmitting and receiving data. Through wireless communication, desired book data or the like can be purchased and downloaded from an electronic book server.

This embodiment can be combined with the structure described in any of the other embodiments and an example as appropriate.

Embodiment 5

A liquid crystal display device disclosed in this specification can be applied to a variety of electronic appliances (including game machines). Examples of electronic appliances are a television set (also referred to as a television or a television receiver), a monitor of a computer or the like, a digital camera, a digital video camera, a digital photo frame, a mobile phone handset (also referred to as a mobile phone or a mobile phone device), a portable game console, a portable information terminal, an audio reproducing device, a large-sized game machine such as a pachinko machine, and the like.

Figure 12A:
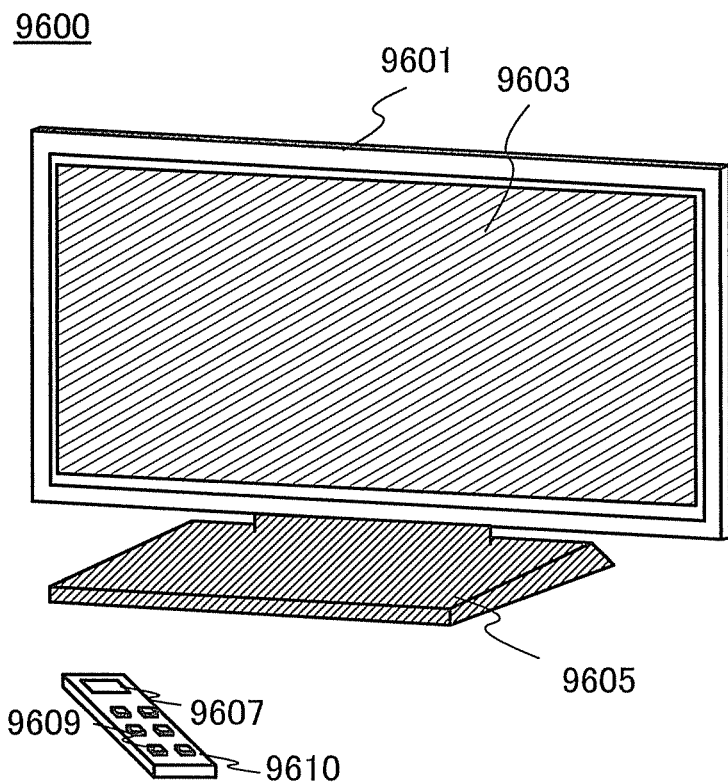
FIGS. 12A and 12B illustrate an example of a television set and an example of a digital photo frame, respectively.

FIG. 12A illustrates an example of a television set. In a television set 9600, a display portion 9603 is incorporated in a housing 9601. The display portion 9603 can display images. Further, here, the housing 9601 is supported by a stand 9605.

The television set 9600 can be operated with an operation switch of the housing 9601 or a separate remote controller 9610. Channels and volume can be controlled with an operation key 9609 of the remote controller 9610 so that an image displayed on the display portion 9603 can be controlled. Furthermore, the remote controller 9610 may be provided with a display portion 9607 for displaying data output from the remote controller 9610.

Note that the television set 9600 is provided with a receiver, a modem, and the like. With the use of the receiver, general television broadcasting can be received. Moreover, when the television set 9600 is connected to a communication network with or without wires via the modem, one-way (from a sender to a receiver) or two-way (between a sender and a receiver or between receivers) information communication can be performed.

Figure 12B:
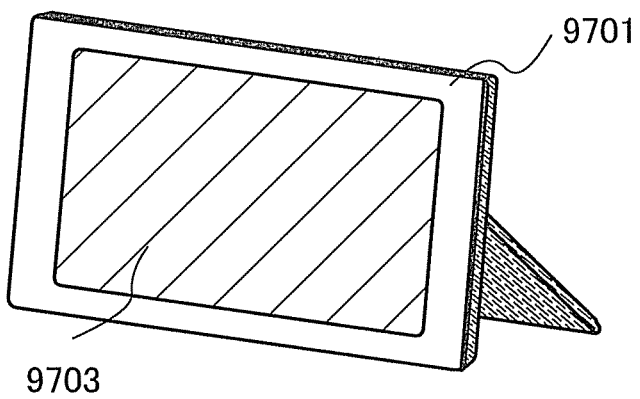

FIG. 12B illustrates an example of the digital photo frame. For example, in a digital photo frame 9700, a display portion 9703 is incorporated in a housing 9701. The display portion 9703 can display a variety of images. For example, the display portion 9703 can display data of an image taken with a digital camera or the like and function as a normal photo frame.

Note that the digital photo frame 9700 is provided with an operation portion, an external connection portion (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for improving the design of the digital photo frame 9700. For example, a memory storing data of an image taken with a digital camera is inserted in the recording medium insertion portion of the digital photo frame, whereby the image data can be transferred and then displayed on the display portion 9703.

The digital photo frame 9700 may be configured to transmit and receive data wirelessly. The structure may be employed in which desired image data is transferred wirelessly to be displayed.

Figure 13A:
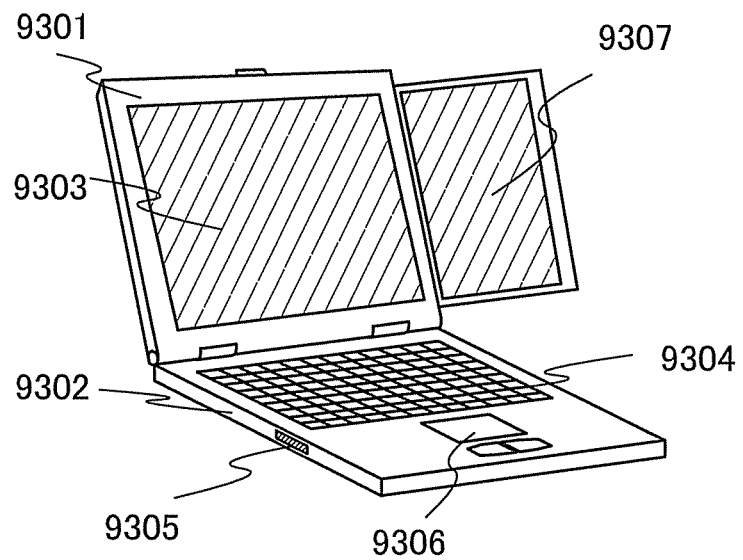
FIGS. 13A and 13B illustrate an example of a portable computer and an example of a mobile phone, respectively.

FIG. 13A is a perspective view illustrating an example of a portable computer.

In the portable computer in FIG. 13A, a top housing 9301 having a display portion 9303 and a bottom housing 9302 having a keyboard 9304 can overlap with each other by closing a hinge unit which connects the top housing 9301 and the bottom housing 9302. The portable computer is convenient for carrying, and in the case of using the keyboard for input, the hinge unit is opened so that the user can input looking at the display portion 9303.

The bottom housing 9302 includes a pointing device 9306 with which input can be performed, in addition to the keyboard 9304. Further, when the display portion 9303 is a touch input screen, input can be performed by touching part of the display portion. The bottom housing 9302 includes an arithmetic function portion such as a CPU or hard disk. In addition, the bottom housing 9302 includes another device, for example, an external connection port 9305 into which a communication cable conformable to communication standards of a USB is inserted.

The top housing 9301 includes a display portion 9307 and can keep the display portion 9307 therein by sliding it toward the inside of the top housing 9301; thus, the top housing 9301 can have a large display screen. In addition, the user can adjust the orientation of a screen of the display portion 9307, which can be kept in the top housing 9301. When the display portion 9307 which can be kept in the top housing 9301 is a touch input screen, input can be performed by touching part of the display portion 9307 which can be kept in the top housing 9301.

The display portion 9303 or the display portion 9307 which can be kept in the top housing 9301 are formed with an image display device of a liquid crystal display panel, a light-emitting display panel such as an organic light-emitting element or an inorganic light-emitting element, or the like.

In addition, the portable computer illustrated in FIG. 13A can be provided with a receiver and the like to receive TV broadcasting to display images on the display portion. The user can watch television broadcast when the whole screen of the display portion 9307 is exposed by sliding the display portion 9307 while the hinge unit which connects the top housing 9301 and the bottom housing 9302 is kept closed. In this case, the hinge unit is not opened and display is not performed on the display portion 9303. In addition, start up of only a circuit for displaying television broadcast is performed. Therefore, power can be consumed to the minimum, which is useful for the portable computer whose battery capacity is limited.

Figure 13B:
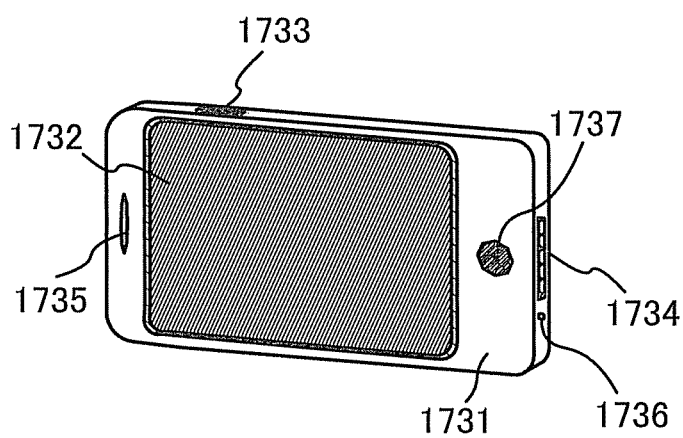

FIG. 13B illustrates an example of a mobile phone handset. A mobile phone handset 1700 illustrated in FIG. 13B includes operation buttons 1733 and 1737, an external connection port 1734, a speaker 1735, a microphone 1736, and the like in addition to a display portion 1732 incorporated in a housing 1731.

The display portion 1732 of the mobile phone handset 1700 in FIG. 13B is a touch screen. When the display portion 1732 is touched with a finger or the like, contents displayed on the display portion 1732 can be controlled.

Further, operations such as making calls and texting can be performed by touching the display portion 1732 with a finger or the like.

There are mainly three screen modes of the display portion 1732. The first mode is a display mode mainly for displaying images. The second mode is an input mode mainly for inputting data such as text. The third mode is a display-and-input mode in which two modes of the display mode and the input mode are combined.

For example, in the case of making a call or texting, a text input mode mainly for inputting text is selected for the display portion 1732 so that characters displayed on a screen can be inputted. In that case, it is preferable to display a keyboard or number buttons on a large area of the screen of the display portion 1732.

When a detection device including a sensor for detecting inclination, such as a gyroscope or an acceleration sensor, is provided inside the mobile phone handset 1700 illustrated in FIG. 13B, display information on the screen of the display portion 1732 can be automatically changed by determining the orientation of the mobile phone handset (whether the mobile phone handset is placed horizontally or vertically for a landscape mode or a portrait mode).

The screen modes are changed by touching the display portion 1732 or using the operation button 1737 of the housing 1731. Alternatively, the screen modes may be changed depending on kinds of images displayed on the display portion 1732. For example, when a signal of an image displayed on the display portion is the one of moving image data, the screen mode can be switched to the display mode. When the signal is the one of text data, the screen mode can be switched to the input mode.

Further, in the input mode, when input by touching the display portion 1732 is not performed for a certain period while a signal detected by the optical sensor in the display portion 1732 is detected, the screen mode may be controlled so as to be changed from the input mode to the display mode.

The display portion 1732 may function as an image sensor. For example, an image of the palm print, the fingerprint, or the like is taken by an image sensor when the display portion 1732 is touched with a palm or a finger, whereby personal authentication can be performed. Further, when a backlight that emits near-infrared light or a sensing light source that emits near-infrared light is provided in the display portion, a finger vein, a palm vein, or the like can be taken.

This embodiment can be combined with the structure described in any of the other embodiments and an example as appropriate.

Example 1

In this example, the electrical characteristics of a thin film transistor included in a liquid crystal display device that is one embodiment of the present invention will be described.

First, a method for manufacturing a thin film transistor including a microcrystalline silicon semiconductor in a channel formation region is described with reference to FIGS. 6A to 6D and FIGS. 8A to 8C.

First, a base insulating film (not shown here) was formed over a substrate 118, and a gate electrode 401 was formed over the base insulating film.

Here, a glass substrate (EAGLE XG manufactured by Corning Incorporated) was used as the substrate 118.

The gate electrode 401 had a structure in which an aluminum layer was sandwiched between titanium layers. Specifically, first, a first titanium film with a thickness of 50 nm was formed over the base insulating film by sputtering a titanium target with argon ions. At this time, the flow rate of argon which was introduced was 20 sccm, the pressure in the process chamber was 0.1 Pa, the applied voltage was 12 kW, and the temperature was room temperature. Then, an aluminum target was sputtered with argon ions, so that an aluminum film with a thickness of 100 nm was formed. At this time, the flow rate of argon which was introduced was 50 sccm, the pressure in the process chamber was 0.4 Pa, the applied voltage was 4 kW and the temperature was room temperature. Furthermore, a titanium target was sputtered with argon ions, so that a second titanium film with a thickness of 50 nm was formed. The second titanium film was formed by the same method as that of the first titanium film. In other words, the flow rate of argon which was introduced was 20 sccm, the pressure in the process chamber was 0.1 Pa, the applied voltage was 12 kW, and the temperature was room temperature.

Next, a resist was applied over the titanium film and was irradiated with light with the use of a first photomask and developed to form a resist mask.

Then, etching was performed using the resist mask, so that the gate electrode 401 was formed. Here, two-step etching was performed using an inductively coupled plasma (ICP) apparatus. That is, the first etching was performed under the following condition: the ICP power was 600 W; the bias power was 250 W; boron trichloride and chlorine were introduced as an etching gas at flow rates of 60 sccm and 20 sccm, respectively; and the pressure in a process chamber was 1.2 Pa. After that, the second etching was performed under the following condition: the ICP power was 500 W, the bias power was 50 W, the pressure was 2.0 Pa, carbon tetrafluoride was introduced at a flow rate of 80 sccm as an etching gas, and the pressure inside the process chamber was 2.0 Pa. Then, the resist mask was removed.

Next, a gate insulating film 402 was formed over the gate electrode 401 and the base insulating film, and then subjected to plasma treatment.

In this example, a silicon nitride film with a thickness of 300 nm was stacked as the gate insulating film 402 by a plasma CVD method and subjected to the plasma treatment. The silicon nitride film was formed by plasma discharge performed under the following condition: silane, hydrogen, nitrogen, and ammonia were introduced as a source gas at flow rates of 15 sccm, 200 sccm, 180 sccm, and 500 sccm, respectively; the pressure in a process chamber was 100 Pa; the RF power source frequency was 13.56 MHz; and the power of the RF power source was 200 W. Note that the gate insulating film 402 was stacked using a parallel plate plasma treatment apparatus in which the upper electrode temperature was 250° C., the lower electrode temperature was 290° C., and the distance (gap) between the upper electrode and the lower electrode was 30 mm.

The plasma treatment for the formed silicon nitride film was performed by plasma discharge for three minutes under the following condition: dinitrogen monoxide was introduced at a flow rate of 400 sccm, the pressure in the process chamber was 60 Pa, and the power was 300 W. Note that the plasma treatment was performed using a parallel-plate plasma treatment apparatus, in which the upper electrode temperature was 250° C., the lower electrode temperature was 290° C., and a distance between the upper electrode and the lower electrode was 30 mm.

Next, a seed crystal 307 with a thickness of 5 nm was formed over the gate insulating film 402 by a plasma CVD method. The seed crystal 307 was stacked by plasma discharge performed under the following condition: silane, hydrogen, and argon are introduced as a source gas at flow rates of 6 sccm, 750 sccm, and 750 sccm, respectively; the pressure inside a process chamber was 532 Pa; the RF power source frequency was 13.56 MHz; and the power of the RF power source was 250 W. Note that the seed crystal 307 is stacked using a parallel-plate plasma treatment apparatus, in which the upper electrode temperature was 250° C., the lower electrode temperature was 290° C., and the distance between the upper electrode and the lower electrode was 15 mm.

A structure obtained through the steps up to this point is illustrated in FIG. 6A.

Next, a microcrystalline semiconductor film 109 with a thickness of 85 nm was formed by a plasma CVD method over the gate insulating film 402 and the seed crystal 307. The microcrystalline silicon semiconductor film 109 was stacked by plasma discharge performed under the following condition: silane, hydrogen, and argon were introduced as a source gas at flow rates of 1.8 sccm, 750 sccm, and 750 sccm, respectively; the pressure in the process chamber was 5000 Pa; the RF power source frequency was 13.56 MHz; the power of the RF power source was 125 W. Note that the microcrystalline semiconductor film 109 was stacked using a parallel-plate plasma treatment apparatus, in which the upper electrode temperature was 250° C., the lower electrode temperature was 290° C., and the distance between the upper electrode and the lower electrode was 7 mm.

A structure obtained through the steps is illustrated in FIG. 6B.

Next, a semiconductor film 111 with a thickness of 80 nm was formed over the microcrystalline semiconductor film 109, and an impurity semiconductor film 113 with a thickness of 50 nm was formed over the semiconductor film 111. The semiconductor film 111 and the impurity semiconductor film 113 were formed by a plasma CVD method.

The semiconductor film 111 was stacked by plasma discharge performed under the following condition: silane, 1000 ppm ammonia (diluted with hydrogen), hydrogen, and argon were introduced as a source gas at flow rates of 20 sccm, 50 sccm, 700 sccm, and 750 sccm, respectively; the pressure in the process chamber was 350 Pa; the RF power source frequency was 13.56 MHz; and the power of the RF power source was 60 W. Note that here, the semiconductor film 111 was stacked using a parallel-plate plasma treatment apparatus, in which the upper electrode temperature was 200° C., the lower electrode temperature was 290° C., and the distance between the upper electrode and the lower electrode was 25 mm.

As the impurity semiconductor film 113, an amorphous silicon film to which phosphorus was added was formed. The impurity semiconductor film 113 was stacked by plasma discharge performed under the following condition: silane, 5% phosphine (diluted with silane), and hydrogen were introduced as a source gas at flow rates of 80 sccm, 50 sccm, and 750 sccm, respectively; the pressure in the process chamber was 1250 Pa; the RF power source frequency was 13.56 MHz; and the power of the RF power source was 60 W. Note that the impurity semiconductor film 113 was stacked using the parallel-plate plasma treatment apparatus, in which the upper electrode temperature was 250° C., the lower electrode temperature was 290° C., and the distance between the upper electrode and the lower electrode was 15 mm.

Next, a resist was applied over the impurity semiconductor film 113 and was irradiated with light with the use of a second photomask and developed to form a resist mask 115. A structure obtained through the steps up to this point is illustrated in FIG. 6C.

Next, the microcrystalline semiconductor film 109, the semiconductor film 111, and the impurity semiconductor film 113 were etched with the use of the resist mask 115, so that a semiconductor stack 117 including a microcrystalline semiconductor region 117a and an amorphous semiconductor region 117b, and an impurity semiconductor film 121 were formed.

In this example, the etching was performed using an ICP apparatus under the following condition: the ICP power was 450 W; the bias power was 100 W; boron trichloride, carbon tetrafluoride, and oxygen were introduced as an etching gas at flow rates of 36 sccm, 36 sccm, and 8 sccm, respectively; and the pressure in a process chamber was 2 Pa.

After that, oxygen plasma treatment was performed, so that an oxide film was formed on side surfaces of the impurity semiconductor film 121 and the semiconductor stack 117 including the microcrystalline semiconductor region 117a and the amorphous semiconductor region 117b. Then, the resist mask 115 was removed (not shown).

For the oxygen plasma treatment, plasma discharge was performed under the following condition: oxygen was introduced at a flow rate of 100 sccm, the pressure in the process chamber was 0.67 Pa, the substrate temperature was −10° C., the source power was 2000 W, and the bias power was 350 W.

Figure 6D:
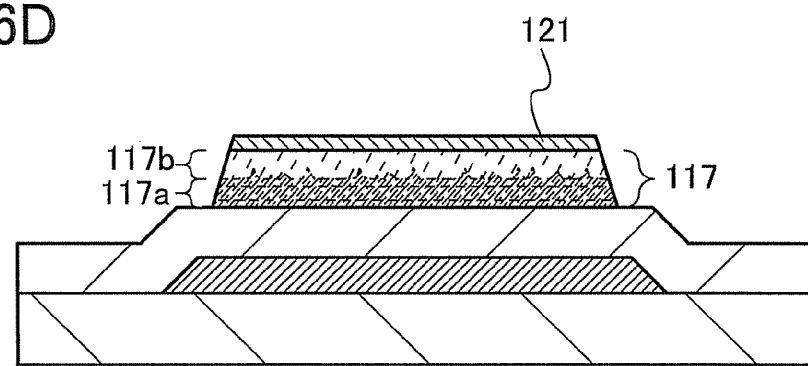

A structure obtained through the steps up to this point is illustrated in FIG. 6D.

Next, a conductive film 127 was formed to cover the gate insulating film 402, the semiconductor stack 117, and the impurity semiconductor film 121. A structure obtained through the step is illustrated in FIG. 8A.

In this example, the conductive film 127 had a structure in which an aluminum layer was sandwiched between titanium layers and was formed in a manner similar to that of the gate electrode 401. Note that the thicknesses of the first titanium film, the aluminum film, and the second titanium film were 50 nm, 200 nm, and 50 nm, respectively.

Next, a resist was applied over the conductive film 127 and was irradiated with light with the use of a third photomask and developed to form a resist mask. Dry etching was performed on the conductive film 127 with the use of the resist mask, so that a source electrode 405a and a drain electrode 405b were formed at the same time as etching of part of the semiconductor stack 117, whereby a semiconductor stack 133 including a microcrystalline semiconductor region 133a and a pair of amorphous semiconductor regions 133b was formed.

In this step, the etching was performed using an ICP apparatus under the following condition: the ICP power was 450 W; the bias power was 100 W; boron trichloride and chlorine were introduced as an etching gas at flow rates of 60 sccm and 20 sccm, respectively; and the pressure in the process chamber was 1.9 Pa.

Note that the semiconductor stack 117 was etched to a depth of 160 nm from its surface. Note that the planar shape of each of the source electrode 405a and the drain electrode 405b was linear in this example.

Next, a surface of the semiconductor stack 133 was subjected to water plasma treatment, whereby impurities remaining on the surface of the semiconductor stack 133 were removed. In this step, the water plasma treatment was performed under the following condition: the power was 1800 W, water vapor was introduced at a flow rate of 300 sccm, and the pressure in a process chamber was 66.5 Pa.

A structure obtained through the steps up to this point is illustrated in FIG. 8B.

Next, a silicon nitride film with a thickness of 300 nm was formed as an insulating film 407. The insulating film 407 was stacked by plasma discharge performed under the following condition: silane, ammonia, nitrogen, and hydrogen were introduced as a source gas at flow rates of 20 sccm, 220 sccm, 450 sccm, and 450 sccm, respectively; the pressure in a process chamber was 160 Pa; the RF power source frequency was 27 MHz; and the power of the RF power source was 200 W. Note that the insulating film 407 was stacked using a parallel-plate plasma treatment apparatus, in which the upper electrode temperature was 250° C., the lower electrode temperature was 290° C., and the distance between the upper electrode and the lower electrode was 21

Next, a resist was applied over the insulating film 407 and was irradiated with light with the use of a fourth photomask and developed to form a resist mask. Part of the insulating film is dry-etched with the use of the resist mask, so that the source electrode 405a and the drain electrode 405b were exposed. In addition, part of the insulating film 407 and part of the gate insulating film 402 were dry-etched, so that the gate electrode 401 was exposed. Then, the resist mask was removed.

Next, a conductive film was formed over the insulating film 407. After that, a resist was applied over the conductive film and was irradiated with light with the use of a fifth photomask and developed to form a resist mask. Part of the conductive film was wet etched with the use of the mask formed of the resist, so that a back gate electrode 410 was formed.

Here, as the conductive film, an indium tin oxide with a thickness of 50 nm was formed by a sputtering method, and was subjected to wet etching treatment to form the back gate electrode 410. Although not illustrated, the back gate electrode 410 was connected to the gate electrode 401. After that, the resist mask was removed.

Through the above-described process, a dual-gate thin film transistor (referred to as TFT1) was manufactured (see FIG. 8C).

Next, a method for manufacturing a thin film transistor including amorphous silicon in a channel formation region is described as a comparative example. The thin film transistor including amorphous silicon can be formed by forming the seed crystal 307, the microcrystalline semiconductor film 109, and the semiconductor film 111 with the use of amorphous silicon. Therefore, FIGS. 8A to 8C and FIG. 10 can be referred to, and the semiconductor film 111, an microcrystalline semiconductor region 111a, an amorphous semiconductor region 111b, the island-shaped semiconductor stack 117, the microcrystalline semiconductor region 117a, the amorphous semiconductor region 117b, the semiconductor stack 133, the microcrystalline semiconductor region 133a, and the amorphous semiconductor region 133b, which are described in the manufacturing process, are formed using amorphous silicon films.

A base insulating film and the substrate 118 included in the thin film transistor were the same as those described above. The gate electrode 401 was the same as the one described above.

A silicon nitride film with a thickness of 300 nm was stacked as the gate insulating film 402 by a plasma CVD method and subjected to plasma treatment. The silicon nitride film was formed by plasma discharge performed under the following condition: silane, hydrogen, nitrogen, and ammonia were introduced as a source gas at flow rates of 40 sccm, 500 sccm, 550 sccm, and 140 sccm, respectively; the pressure in the process chamber was 100 Pa; the RF power source frequency was 13.56 MHz; and the power of the RF power source was 370 W. Note that the gate insulating film 402 was stacked using the parallel-plate plasma treatment apparatus, in which the substrate temperature was 280° C. and the distance (gap) between the upper electrode and the lower electrode was 24.5 mm.

The plasma treatment performed on the formed silicon nitride film was performed by plasma discharge for 5 minutes under the following condition: hydrogen was introduced into a process chamber at a flow rate of 1500 sccm; the pressure in the process chamber was 280 Pa; and the power was 50 W. Note that the plasma treatment was performed using a parallel-plate plasma treatment apparatus, in which the substrate temperature was 280° C. and the distance between the upper electrode and the lower electrode was 24.5 mm.

Next, an amorphous silicon film with a thickness of 205 nm was formed in place of the microcrystalline semiconductor film 109 and the semiconductor film 111, and the impurity semiconductor film 113 with a thickness of 50 nm was formed over the amorphous silicon film. The amorphous silicon film and the impurity semiconductor film 113 were formed by a plasma CVD method.

The amorphous silicon film was formed by plasma discharge in the following condition: silane and hydrogen were introduced at flow rates of 280 sccm and 300 sccm, respectively; the pressure in a process chamber was 170 Pa; the RF power source frequency was 13.56 MHz; and the power of the RF power source was 60 W. Note that the semiconductor film 111 was stacked using a parallel-plate plasma treatment apparatus, in which the substrate temperature was 280° C. and the distance between the upper electrode and the lower electrode was 24.5 mm.

As the impurity semiconductor film 113, an amorphous silicon film to which phosphorus was added was formed. The impurity semiconductor film 113 was stacked by plasma discharge under the following condition: silane, 0.5% phosphine (diluted with hydrogen) were introduced as a source gas at flow rates of 100 sccm and 170 sccm, respectively; the pressure in a process chamber was 100 Pa, the RF power source frequency was 13.56 MHz, and the power of the RF power was 370 W. Note that the impurity semiconductor film 113 was stacked using a parallel-plate plasma treatment apparatus, in which the substrate temperature was 280° C. and the distance between the upper electrode and the lower electrode was 24.5 mm.

Next, a resist was applied over the impurity semiconductor film 113 and was irradiated with light with the use of a second photomask and developed to form the resist mask 115.

Next, the amorphous silicon film and the impurity semiconductor film 113 were etched with the use of the resist mask 115, so that an island-shaped amorphous silicon film and an island-shaped impurity semiconductor film 121 were formed.

In this example, the etching was performed using an ICP apparatus under the following condition: the source power was 1000 W, the bias power was 80 W, chlorine was introduced as an etching gas at a flow rate of 100 sccm, and the pressure in a process chamber was 1.51 Pa.

Then, the conductive film 127 was formed to cover the gate insulating film 402, the amorphous silicon film, and the impurity semiconductor film 121.

In this example, the conductive film 127 had a structure in which an aluminum layer was sandwiched between titanium layers and was formed in a manner similar to that of the gate electrode 401. Note that the thicknesses of the first titanium film, the aluminum film, and the second titanium film were 50 nm, 200 nm, and 50 nm, respectively.

Next, a resist was applied over the conductive film 127 and was irradiated with light with the use of a third photomask and developed to form a resist mask. Dry etching was performed on the conductive film 127 with the use of the resist mask, so that the source electrode 405a and the drain electrode 405b were formed at the same time as partly etching of the amorphous silicon film and the impurity semiconductor film 121.

In this step, the etching was performed using an ICP apparatus under the following condition: the ICP power was 450 W; the bias power was 100 W; boron trichloride and chlorine were introduced as an etching gas at flow rates of 60 sccm and 20 sccm, respectively; and the pressure in the process chamber was 1.9 Pa.

Note that in this process, in addition to part of the conductive film 127, part of the amorphous silicon and part of the impurity semiconductor film 121 are etched to a depth of approximately 80 nm from the surface. Note that the planar shape of each of the source electrode 405a and the drain electrode 405b was linear in this example.

Next, a silicon nitride film with a thickness of 300 nm was formed as the insulating film 407. The insulating film 407 was stacked by plasma discharge performed under the following condition: silane, ammonia, nitrogen, and hydrogen were introduced as a source gas at flow rates of 20 sccm, 220 sccm, 450 sccm, and 450 sccm, respectively; the pressure in a process chamber was 160 Pa; the RF power source frequency was 27 MHz; and the power of the RF power source was 200 W. Note that the impurity semiconductor film 407 was stacked using a parallel-plate plasma treatment apparatus, in which the upper electrode temperature was 250° C., the lower electrode temperature was 290° C., and the distance between the upper electrode and the lower electrode was 21 mm.

Next, a resist was applied over the insulating film 407 and was irradiated with light with the use of a fourth photomask and developed to form a resist mask. Part of the insulating film was dry-etched with the use of the resist mask, so that the source electrode 405a and the drain electrode 405b were exposed. In addition, part of the insulating film 407 and part of the gate insulating film 402 were dry-etched, so that the gate electrode 401 was exposed. Then, the resist mask was removed.

Through the above-described process, a single-gate amorphous silicon thin film transistor (referred to as TFT2) was manufactured.

Figure 14A:
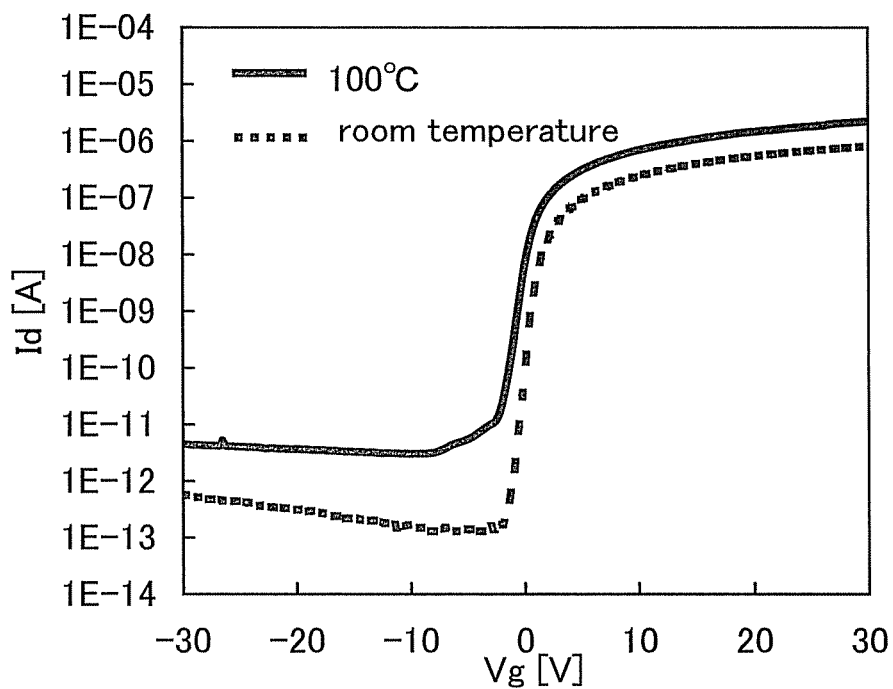
FIGS. 14A and 14B are graphs each showing results of the electrical characteristics of a transistor included in a liquid crystal display device.
Figure 14B:
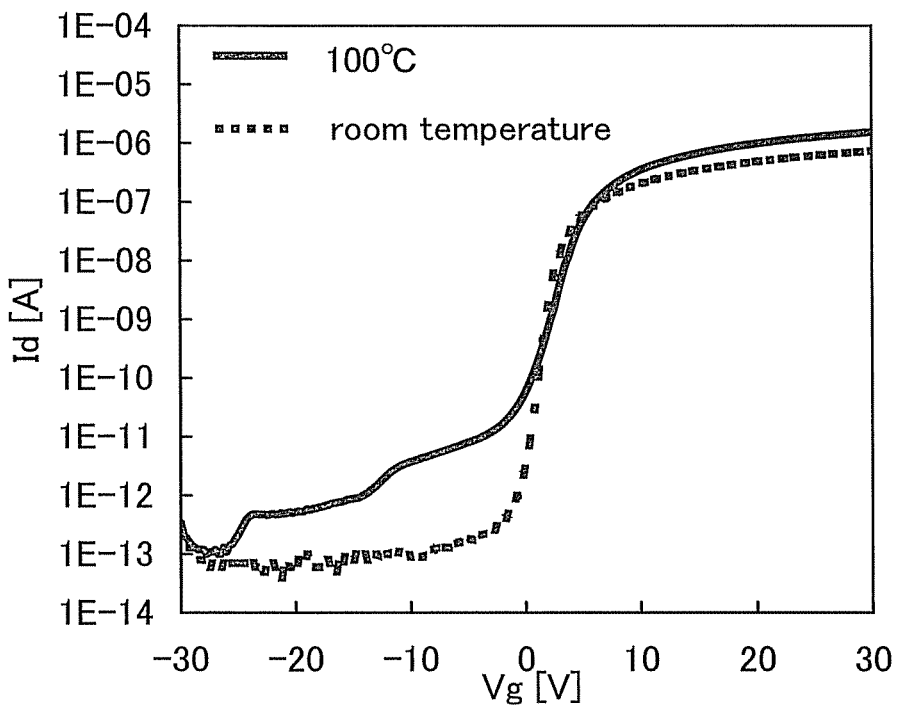

FIGS. 14A and 14B show measurement results of the electrical characteristics of TFT1 and TFT2, respectively. In FIGS. 14A and 14B, a dotted line denotes a measurement result of the electrical characteristics at room temperature, and a solid line denotes that at 100° C. FIGS. 14A and 14B show the electrical characteristics in the case where gate voltage is applied to only the gate electrode 401 and the drain voltage is 1V. The field-effect mobility of TFT1 in this example was calculated on the assumption that the channel length was 3.2 μm, the channel width was 22.1 μm, the thickness of the gate insulating film was 300 nm, and the average permittivity was 7.0. The field-effect mobility of TFT2 was calculated on the assumption that the channel length was 3.7 μm, the channel width was 22.0 μm, the thickness of the gate insulating film was 300 nm, and the average permittivity was 7.0.

It was confirmed from FIGS. 14A and 14B that good electrical characteristics of TFT1 including a microcrystalline silicon semiconductor in the channel formation region could be obtained when measurement was performed at room temperature and at 100° C., whereas good electrical characteristics of TFT2 could be obtained when measurement was performed at room temperature but could not be obtained when measurement was performed at 100° C.

As described above, since the thin film transistor including a microcrystalline semiconductor in the channel formation region has good electrical characteristics even at a high temperature, a liquid crystal display device including the thin film transistor can be a high definition liquid crystal display device which can be for outdoor use and can correct a change in a color tone.

This application is based on Japanese Patent Application serial no. 2010-177025 filed with Japan Patent Office on Aug. 6, 2010, the entire contents of which are hereby incorporated by reference.

What is claimed is:

1. A liquid crystal display device comprising:
a pair of light-transmitting substrates;
a pixel portion provided between the pair of light-transmitting substrates;
a monitoring pixel portion provided between the pair of light-transmitting substrates, the monitoring pixel portion comprising a first electrode, a second electrode and a liquid crystal layer between the first electrode and the second electrode;
a lighting portion;
a first polarizing member;
a second polarizing member facing the first polarizing member with the pair of light-transmitting substrates provided therebetween;
a reflective member facing the second polarizing member with the pair of light-transmitting substrates, the first polarizing member and the lighting portion provided therebetween;
a first optical sensor, wherein the first optical sensor does not overlap with the pixel portion and the monitoring pixel portion;
a second optical sensor facing the reflective member with the second polarizing member, the pair of light-transmitting substrates, the liquid crystal layer of the monitoring pixel portion, the second polarizing member and the lighting portion provided therebetween; and
a sensor control portion,
wherein the pixel portion comprises a transistor and a pixel electrode electrically connected to the transistor,
wherein the first optical sensor is configured to detect illuminance of external light,
wherein the reflective member is configured to reflect external light and to make light incident on the pixel portion,
wherein the second optical sensor is configured to detect a color tone of light from the lighting portion and external light which are transmitted through the first polarizing member, the liquid crystal layer and the second polarizing member,
wherein the sensor control portion is operationally connected to the first optical sensor, the second optical sensor, the monitoring pixel portion, and a lighting control portion,
wherein the sensor control portion is configured to feed signals from the first optical sensor and the second optical sensor to the lighting control portion,
wherein the sensor control portion is configured to send a signal for emission of light correcting a change in the color tone of at least one of light from the lighting portion and external light to the lighting control portion when the second optical sensor detects the change in the color tone of at least one of light from the lighting portion and external light, wherein the sensor control portion is configured to feed a signal from the first optical sensor to the lighting control portion configured to control the lighting portion to change a display mode into a reflective type that does not use light emitted from the lighting portion, wherein the lighting portion is configured to emit light when the first optical sensor detects illuminance which is too low to display an image by the reflective type, wherein the lighting portion is configured to stop emitting light from the lighting portion in accordance with the signal from the first optical sensor to change the display mode into the reflective type that does not use light emitted from the lighting portion for displaying an image, and wherein the liquid crystal display device is configured to switch the display mode between the reflective type and a transmissive type depending on illuminance of external light which is detected by the first optical sensor.

2. The liquid crystal display device according to claim 1, wherein the lighting portion comprises a light guide member and a light source configured to emit light having a predetermined wavelength.

3. The liquid crystal display device according to claim 2, further comprising an optical member between the first polarizing member and the light guide member.

4. The liquid crystal display device according to claim 1, wherein the lighting portion emits light having a predetermined wavelength depending on a color tone of the monitoring pixel portion which is detected by the second optical sensor to correct a color tone of the pixel portion.

5. A liquid crystal display device comprising:
a first light-transmitting substrate;
a pixel portion provided over the first light-transmitting substrate;
a monitoring pixel portion provided over the first light-transmitting substrate, the monitoring pixel portion comprising a transistor and a liquid crystal element including a liquid crystal layer;
a second light-transmitting substrate over the pixel portion and the monitoring pixel portion;
a lighting portion under the first light-transmitting substrate;
a first polarizing member between the first light-transmitting substrate and the lighting portion;
a reflective member provided under the lighting portion;
a second polarizing member over the second light-transmitting substrate;
a first optical sensor over the second light-transmitting substrate;
a second optical sensor over the second polarizing member and overlapping with the monitoring pixel portion; and
a sensor control portion;

wherein the reflective member is configured to reflect external light and to make light incident on the pixel portion, wherein the second optical sensor overlaps with the reflective member with the lighting portion, the first polarizing member, the liquid crystal layer of the monitoring pixel portion and the second polarizing member provided therebetween, wherein the first optical sensor does not overlap with the pixel portion and the monitoring pixel portion, wherein the first optical sensor is configured to detect illuminance of external light, wherein the second optical sensor is configured to detect a color tone of light from the lighting portion and external light which are transmitted through the first polarizing member, the liquid crystal layer and the second polarizing member, wherein the sensor control portion is operationally connected to the first optical sensor, the second optical sensor, the monitoring pixel portion, and a lighting control portion, wherein the sensor control portion is configured to feed signals from the first optical sensor and the second optical sensor to the lighting control portion, wherein the sensor control portion is configured to send a signal for emission of light correcting a change in the color tone of at least one of light from the lighting portion and external light to the lighting control portion when the second optical sensor detects the change in the color tone of at least one of light from the lighting portion and external light, wherein the sensor control portion is configured to feed a signal from the first optical sensor to the lighting control portion configured to control the lighting portion to change a display mode into a reflective type that does not use light emitted from the lighting portion, wherein the lighting portion is configured to emit light when the first optical sensor detects illuminance which is too low to display an image by the reflective type, wherein the lighting portion is configured to stop emitting light from the lighting portion in accordance with the signal from the first optical sensor to change the display mode into the reflective type that does not use light emitted from the lighting portion for displaying an image, and wherein the liquid crystal display device is configured to switch the display mode between the reflective type and a transmissive type depending on illuminance of external light which is detected by the first optical sensor.

6. The liquid crystal display device according to claim 5, wherein the lighting portion comprises a light guide member and a light source configured to emit light having a predetermined wavelength.

7. The liquid crystal display device according to claim 6, further comprising an optical member between the first polarizing member and the light guide member.

8. The liquid crystal display device according to claim 5, wherein the lighting portion emits light having a predetermined wavelength depending on a color tone of the monitoring pixel portion which is detected by the second optical sensor to correct a color tone of the pixel portion.

9. The liquid crystal display device according to claim 5, wherein the transistor includes a semiconductor including a plurality of crystal regions.

10. The liquid crystal display device according to claim 5, wherein the transistor includes an oxide semiconductor.

11. A liquid crystal display device comprising:
a first light-transmitting substrate comprising a first surface and a second surface;
a second light-transmitting substrate comprising a first surface and a second surface;
a pixel portion between the first surface of the first light-transmitting substrate and the first surface of the second light-transmitting substrate;

a monitoring pixel portion between the first surface of the first light-transmitting substrate and the first surface of the second light-transmitting substrate;
a reflective member;
a lighting portion between the reflective member and the second surface of the first light-transmitting substrate;
a first optical sensor on the second surface of the second light-transmitting substrate;
a second optical sensor on the second surface of the second light-transmitting substrate; and
a sensor control portion;
wherein each of the pixel portion and the monitoring pixel portion comprises a pixel including a liquid crystal element including a liquid crystal layer and a transistor electrically connected to the liquid crystal element,
wherein the reflective member configured to reflect external light and to make light incident on the pixel portion,
wherein the first optical sensor does not overlap with the pixel portion and the monitoring pixel portion,
wherein the second optical sensor overlaps with the liquid crystal layer of the monitoring pixel portion and the lighting portion,
wherein the first optical sensor is configured to detect illuminance of external light,
wherein the second optical sensor is configured to detect a color tone of light from the lighting portion and external light which are transmitted through the liquid crystal layer, wherein the sensor control portion is operationally connected to the first optical sensor, the second optical sensor, the monitoring pixel portion, and a lighting control portion,
wherein the sensor control portion is configured to feed signals from the first optical sensor and the second optical sensor to the lighting control portion,
wherein the sensor control portion is configured to send a signal for emission of light correcting a change in the color tone of at least one of light from the lighting portion and external light to the lighting control portion when the second optical sensor detects the change in the color tone of at least one of light from the lighting portion and external light,
wherein the sensor control portion is configured to feed a signal from the first optical sensor to the lighting control portion configured to control the lighting portion to change a display mode into a reflective type that does not use light emitted from the lighting portion,
wherein the lighting portion is configured to emit light when the first optical sensor detects illuminance which is too low to display an image by the reflective type,
wherein the lighting portion is configured to stop emitting light from the lighting portion in accordance with the signal from the first optical sensor to change the display mode into the reflective type that does not use light emitted from the lighting portion for displaying an image, and
wherein the liquid crystal display device is configured to switch the display mode between the reflective type and a transmissive type depending on illuminance of external light which is detected by the first optical sensor.

12. The liquid crystal display device according to claim 11, further comprising a first polarizing member and a second polarizing member,
wherein the first polarizing member is between the second surface of the second light-transmitting substrate and the lighting portion,
wherein the second polarizing member is over the second surface of the second light-transmitting substrate, and
wherein the second optical sensor overlaps with the monitoring pixel portion with the second polarizing member interposed therebetween.

13. The liquid crystal display device according to claim 11, further comprising a first polarizing member,
wherein the first polarizing member is between the second surface of the second light-transmitting substrate and the lighting portion, and
wherein the lighting portion comprises a light guide member and a light source capable of emitting configured to emit light having a predetermined wavelength.

14. The liquid crystal display device according to claim 13, further comprising an optical member between the first polarizing member and the light guide member.

15. The liquid crystal display device according to claim 1, further comprising a sealing member sandwiched between the pair of light-transmitting substrates,
wherein the sealing member is provided between the pixel portion and the monitoring pixel portion.

16. The liquid crystal display device according to claim 5, further comprising a sealing member sandwiched between the first light-transmitting substrate and the second light-transmitting substrate,
wherein the sealing member is provided between the pixel portion and the monitoring pixel portion.

17. The liquid crystal display device according to claim 11, further comprising a sealing member sandwiched between the first light-transmitting substrate and the second light-transmitting substrate,
wherein the sealing member is provided between the pixel portion and the monitoring pixel portion.

18. A display device comprising:
a pair of light-transmitting substrates;
a pixel portion provided between the pair of light-transmitting substrates;
a monitoring pixel portion provided between the pair of light-transmitting substrates;
a lighting portion;
a first optical sensor not overlapping with the pixel portion and the monitoring pixel portion;
a second optical sensor facing the monitoring pixel portion;
a sensor control portion;
wherein the first optical sensor is configured to detect illuminance of external light,
wherein the second optical sensor is configured to detect a color tone of light from the lighting portion and external light which are transmitted through the monitoring pixel portion,
wherein the sensor control portion is operationally connected to the first optical sensor, the second optical sensor, the lighting portion and a lighting control portion,
wherein the sensor control portion is configured to feed signals from the first optical sensor and the second optical sensor to the lighting control portion,
wherein the sensor control portion is configured to send a signal for emission of light correcting a change in the color tone of at least one of light from the lighting portion and external light to the lighting control portion when the second optical sensor detects the change in the color tone of at least one of light from the lighting portion and external light,
wherein the sensor control portion is configured to feed a signal from the first optical sensor to the lighting control portion configured to control the lighting portion to change a display mode into a reflective type that does not use light emitted from the lighting portion, wherein the lighting portion is configured to emit light when the first optical sensor detects illuminance which is too low to display an image by the reflective type, and wherein the lighting portion is configured to stop emitting light from the lighting portion in accordance with the signal from the first optical sensor to change the display mode into the reflective type that does not use light emitted from the lighting portion for displaying an image.

19. The display device according to claim 18, wherein the lighting portion comprises a light guide member and a light source configured to emit light having a predetermined wavelength.

20. The display device according to claim 18, wherein the lighting portion emits light having a predetermined wavelength depending on a color tone of the monitoring pixel portion which is detected by the second optical sensor to correct a color tone of the pixel portion.

21. The display device according to claim 18, wherein the pixel portion comprises a transistor and a pixel electrode electrically connected to the transistor, wherein the transistor includes a semiconductor including a plurality of crystal regions.

22. The display device according to claim 18, wherein the pixel portion comprises a transistor and a pixel electrode electrically connected to the transistor, wherein the transistor includes an oxide semiconductor.

* * * * *